United States Patent [19]

Clare et al.

[11] Patent Number: 5,465,286
[45] Date of Patent: Nov. 7, 1995

[54] APPARATUS FOR SUPERVISING AN AUTOMATIC CALL DISTRIBUTION TELEPHONE SYSTEM

[75] Inventors: William K. Clare, Parkridge, N.J.; Donn P. Sundby, Brewster, Mass.

[73] Assignee: Executone Information Systems, Inc., Milford, Conn.

[21] Appl. No.: 248,260

[22] Filed: May 24, 1994

[51] Int. Cl.⁶ .............................. H04M 3/22; H04M 3/42; H04M 3/00
[52] U.S. Cl. .................... 379/34; 379/216; 379/265; 379/266; 379/309
[58] Field of Search .................... 379/34, 35, 92, 379/216, 265, 266, 309

[56] References Cited

U.S. PATENT DOCUMENTS

| | | | |
|---|---|---|---|
| 3,739,329 | 6/1973 | Lester | 340/825.49 |
| 3,925,762 | 12/1975 | Heitlinger et al. | 340/150 |
| 4,225,953 | 9/1980 | Simon et al. | 340/312 |
| 4,408,100 | 10/1983 | Pritz et al. | 179/27 D |
| 4,601,064 | 7/1986 | Shipley | 340/825.44 |
| 4,649,385 | 3/1987 | Aires et al. | 340/825.49 |
| 4,788,718 | 11/1988 | McNabb et al. | 379/113 |
| 4,815,120 | 3/1989 | Kosich | 379/34 |
| 4,858,120 | 8/1989 | Samuelson | 379/309 |
| 4,882,473 | 11/1989 | Bergeron et al. | 235/380 |
| 4,953,204 | 8/1990 | Cuschleg, Jr. et al. | 379/266 |
| 4,977,619 | 12/1990 | Crimmins | 655/607 |
| 4,988,209 | 1/1991 | Davidson et al. | 379/112 |
| 5,008,930 | 4/1991 | Gawrys | 379/212 |
| 5,023,868 | 6/1991 | Davidson et al. | 379/112 |
| 5,025,468 | 6/1991 | Sikand et al. | 379/266 |
| 5,038,800 | 8/1991 | Oba | 364/413.02 |
| 5,062,103 | 10/1991 | Davidson et al. | 379/265 |
| 5,101,425 | 3/1992 | Darland | 379/34 |
| 5,119,104 | 6/1992 | Heller | 342/450 |
| 5,164,983 | 11/1992 | Brown et al. | 379/265 |
| 5,185,780 | 2/1993 | Leggett | 379/34 |
| 5,214,688 | 5/1993 | Szlam et al. | 379/112 |
| 5,247,569 | 9/1993 | Cave | 379/266 |
| 5,291,399 | 3/1994 | Chaco | 235/380 |
| 5,299,260 | 3/1994 | Shaio | 379/265 |

OTHER PUBLICATIONS

"Monitoring Solutions" by Steve McNamara Dec. 1989; pp. 66–67; Inbound/Outbound Magazine.
"Custom Plus™ ACD" Product Brochure, Executone® Information Systems, Inc., Aug. 1991 (original and one (1) copy).
"Inforstar/ILS™ Integrated Locating System" Product Brochure, Executone® Information Systems, Inc., 1993 (original and one (1) copy).

*Primary Examiner*—Stephen Chin
*Assistant Examiner*—Vijay Shankar
*Attorney, Agent, or Firm*—Dilworth & Barrese

[57] ABSTRACT

An agent supervising system is used in a telephone call management and distribution system having a plurality of telephone stations assigned to a plurality of agents. The agent supervising system displays agent activities using distinctive color highlighting and text or icon depictions corresponding to agent identification, location and status information on a map representation and in a directory listing graphically represented on a display at the supervisor's station. The agent supervising system also interacts with an agent locating system for locating agents and displaying the agents on the map representation on the supervisor's display. The prediction of pending abandonment of queued calls and color alarms indicating such pending loss of calls are also provided and the potential financial impact of pending loss of calls are determined and displayed.

26 Claims, 16 Drawing Sheets

```
? Help                    ┌─90              Oct 06 1992  15:24:27   ┌100
┌──────────────────────────────────────┐  ┌──────────────────────────────────┐
│ NUM │ AGENT  │ EXT │GR│ TIME │STATE   │P│  │GRP│WAIT│PRIM│SEC│AVL│BUSY│LNGST│
│   4 │ KEVIN D.│  34 │ 7│ 3:47 │Splt 7 │3│  │ 1 │  3 │ 12 │ 5 │ 0 │  5 │0:32 │
│  14 │ GEORGE  │ 462 │ 1│ 1:31 │BusyAcd│0│  │ 2 │  7 │  5 │ 7 │ 0 │  1 │3:09 │
│  21 │ MELVIN  │ 439 │ 1│ 0:14 │Unavail│0│  │ 3 │  6 │  7 │ 5 │ 0 │  4 │3:09 │
│  23 │ MYRTLE  │ 585 │ 1│ 2:00 │Unavail│0│  │ 4 │  3 │  0 │ 0 │ 0 │  0 │0:18 │
│  25 │ DREW    │ 596 │ 1│ 0:38 │Unavail│0│  │ 5 │  0 │  4 │ 0 │ 1 │  1 │0:00 │
│  33 │ JANICE  │ 511 │ 1│ 0:36 │Unavail│0│  │ 6 │  1 │  4 │ 1 │ 0 │  2 │0:18 │
│  35 │ KEITH G │ 194 │ 1│ 2:00 │BusyAcd│0│  │ 7 │  0 │  2 │ 0 │ 0 │  0 │0:00 │
│  37 │ MICHAEL │ 921 │ 1│ 1:55 │Unavail│0│  │ 8 │  0 │ 10 │ 2 │ 8 │  3 │0:00 │
│  40 │ CATHY 3 │ 505 │ 1│ 0:34 │Unavail│0│  │ 9 │  0 │  0 │ 0 │ 0 │  0 │0:00 │─85
│  55 │PHYLLIS 3│ 529 │ 1│ 2:26 │BusyAcd│0│  │10 │  9 │  0 │ 0 │ 0 │  0 │2:06 │
│  56 │ REA 1   │ 494 │ 6│ 0:17 │Unavail│3│  │11 │  0 │  3 │ 0 │ 0 │  2 │0:00 │
│  60 │ BERTHA  │ 498 │ 1│ 0:08 │BusyAcd│0│  │12 │  0 │  0 │ 0 │ 0 │  0 │0:00 │
│  65 │ CHERYL Z│ 512 │ 3│ 0:07 │Unavail│3│  │13 │  1 │  2 │ 0 │ 0 │  2 │2:35 │
│  77 │ ALEX    │ 193 │ 1│ 1:39 │AcdRng │0│  │14 │  2 │  0 │ 5 │ 0 │  3 │5:18 │
│  83 │ MORT    │ 507 │ 6│ 0:00 │AcdRng │0│  │15 │  0 │  3 │ 0 │ 0 │  1 │0:00 │
│  96 │GEORGE I.│ 553 │ 1│ 4:30 │Unavail│0│  └──────────────────────────────────┘
│ 114 │ JUDY F  │ 528 │ 6│ 0:24 │BusyAcd│0│                                   105
│                                        │  ┌──────────┬─────┬─────┬─────────┐
│ NO-RISK    1    TOTAL LOSSES $ 510    │  │ Group    │  1  │Queue│Wait│Lngst│
│                                        │  │ Avg Hold │0:26 │  1  │  3 │0:32 │
│ AT-RISK    [1]                         │  │ Avg Talk │1:32 │  2  │  0 │0:00 │─95
│                                        │  │ Avg Wait │0:18 │  3  │  0 │0:00 │
│ LOSS PENDING  1  PENDING LOSS $ 10    │  │ Recorder │ 165 │  4  │  0 │0:00 │
└────────────────────────────────────────┘  └──────────┴─────┴─────┴─────────┘
                                                                          ─80
```

FIG. 2

DYNAMIC SCREEN PROFILE EDIT

[G] GROUP 1 2 3 4 5

[L]

| AGENT LIST 1 | 1 | 3 | 10 | 14 | 20 |
| AGENT LIST 2 | | | | | |
| AGENT LIST 3 | | | | | |
| AGENT LIST 4 | | | | | |

[A] ALARM THRESHOLDS   GROUP: 1   WAIT 15   LONGEST 300   AGENTS 15

F1-EXIT   U-UPDATE   E-ERASE   ?-HELP

Directory - Floor 3, South                          02:43 PM

Name                   Phone      Location      Status

Mary Jones             3025       Room 313      | BusyAcd |

Janet Parker           3026       Room 309      | Unavail |

Marie Simpson          3109       Room 307      | Split 7 |

Kathy Smith            3167       Room 303      | BusyAcd |

Alice White            3285       Room 305      | Split 3 |

Sylvia Williams        3345       Room 301      | Co In   |

Nancy Wyatt, Manager   3347       Room 314      | Unavail |

Directory - Floor 3, South     02:43 PM

Enter Name of Person to Find [Jones] —122

| Name | Phone | Location | Status |
|---|---|---|---|
| Mary Jones | 3025 | Room 313 | BusyAcd |
| Janet Parker | 3026 | Room 309 | Unavail |
| Marie Simpson | 3109 | Room 307 | Split 7 |
| Kathy Smith | 3167 | Room 303 | BusyAcd |
| Alice White | 3285 | Room 305 | Split 3 |
| Sylvia Williams | 3345 | Room 301 | Co In |
| Nancy Wyatt, Manager | 3347 | Room 314 | Unavail |

124 — (pointing to Mary Jones row)
120 — (frame)

| Events | Group 1 sec. Yellow | sec Red |
|---|---|---|
| Logout | 0 | 0 |
| Avail | 150 | 300 |
| Unavail | 150 | 300 |
| AcdRng | 10 | 20 |
| WrapUp | 10 | 20 |
| FrcWrap | 10 | 20 |
| BusyAcd | 60 | 120 |
| BusyOut | 37 | 75 |
| LogIn | 10 | 20 |
| IcmIn | 30 | 60 |
| CoIn | 60 | 120 |
| IcmRng | 5 | 10 |
| CoRng | 10 | 20 |
| Dnd | 60 | 120 |
| Qualify | 25 | 50 |
| Help | 15 | 30 |
| Split | 60 | 120 |
| IcmOut | 30 | 60 |
| CoOut | 60 | 120 |

F1-Exit — F2-Reset — F3-Save — F4-Help

— 132

```
You may set time intervals for
color alarms for:

Groups
    Lists
    System

F1 - Exit ——— F2 - Help
```

```
Enter the group number  1

F1 - Exit ——— F2 - Help
```

Directory - Floor 3, South      02:43 PM

Enter Name of Person to Find  [Jones]

| Name | Phone | Location Last Seen | How Long Ago [H:M.S] |
|---|---|---|---|
| Mary Jones | 3025 | Room 313 | Now |
| Janet Parker | 3026 | Room 309 | Now |
| Marie Simpson | 3109 | Room 307 | Now |
| Kathy Smith | 3167 | Hallway by Room 303 | 05:30 |
| Alice White | 3285 | Room 305 | Now |
| Sylvia Williams | 3345 | Elevator | Exited |
| Nancy Wyatt, Manager | 3347 | Reception Area | Now |

APPARATUS FOR SUPERVISING AN AUTOMATIC CALL DISTRIBUTION TELEPHONE SYSTEM

FIELD OF INVENTION

This invention relates to telephone systems, and particularly to an agent supervising system and method for use in a call distribution environment.

BACKGROUND INFORMATION

Modern telephone systems are invariably computer controlled; i.e. computers and computer processors perform functions such as call switching, respond to calls automatically, generate error messages on detecting malfunctions, and otherwise implement stored programs and subroutines to operate the telephone system. Other features may be added to enhance the use of the telephone system to be convenient or user friendly. For example, the telephone system may be menu driven by inputs from a telephone keypad to provide user selected functions such as obtaining one's credit card balance or one's telephone bill balance over a touch tone capable telephone.

Some telephone systems automatically distribute incoming or inbound calls among a plurality of telephone stations. These automated call distribution (ACD) systems have been applied, for example, to route inbound telephone calls to telephone stations assigned to specific personnel or inbound agents. In other applications, outbound telephone calls may be initiated by an ACD using automated dialers and predictive dialing techniques, and the ACD then transfers the established calls to outbound agents. ACDs may employ call queues and various distribution algorithms and methods, implemented in software, to enhance performance of the overall telephone system. Some of the above features of ACD are described in greater detail in commonly assigned U.S. patent application Ser. No. 08/123,309, filed Sep. 17, 1993, which is incorporated herein by reference.

ACD telephone systems also may implement monitor or supervisor features; i.e. facilities allowing a supervisor to track the ACD in the telephone system and to evaluate the performance of the personnel or agents in the telephone system. For example, in a telemarketing system such as described in the above incorporated U.S. patent application, a system administrator may display information on a display screen to show the status of the telemarketing campaign and the performance and status of each agent.

To insure proper operation of these computerized telephone systems, such supervising systems are employed separately or as part of the telephone system to allow a system supervisor or administrator to access the information processed by the telephone system, to setup or reconfigure its operation, and to interact with users of the system; i.e. callers or telephone system personnel.

Although agents are assigned to individual telephone stations, individual agents may not be present at their corresponding telephone stations at all times. To avoid automatically distributing an inbound call to an unoccupied telephone station and thus delaying the response to a waiting call, it would be advantageous to integrate the monitoring system with an automated personnel locating system, such as the locating system described in commonly assigned U.S. patent application Ser. No. 08/087,394, filed Jul. 2, 1993, which is incorporated herein by reference. The aforesaid locating system includes a plurality of remote units such as badges which may be worn by people, attached to objects, or incorporated in equipment. The badges wirelessly transmit information including badge identification (ID) information to a nearby stationary transceiver. The stationary transceiver further transmits the badge information to a central computer for processing and identifying the badge and its location. For example, in a hospital environment, staff and patients may be located and audio, video, or data communications may be transmitted throughout the hospital facility; i.e. to a nurse control station, to selected patient stations, and/or to staff stations to achieve enhanced patient care.

In an agent supervising system for an ACD environment for inbound and/or outbound calls, it would be advantageous for an automated locating system operatively coupled to the ACD to provide the agent supervising system with location and information of the agents. The system according to the present invention provides such an integrated supervising system for use in conjunction with a locating system. The system according to the present invention also provides a visual map on the supervisor display to graphically locate each agent and telephone station for a supervisor to efficiently locate specific personnel and objects during ACD operation.

ACD systems having supervising monitoring capabilities have been described. For example, U.S. Pat. No. 5,101,425 to Darland et al. discusses a system for monitoring the operation of an automated dialing system. Menus, windows, and icons in a graphical computer interface are employed to permit a supervisor to select various options and to display further information.

Given the available monitoring systems including the system described in U.S. Pat. No. 5,101,425 which is incorporated herein by reference, there is a need for an ACD system having improved data and status collection in conjunction with enhanced conveyance techniques for an ACD supervisor. The system according to the present invention provides an ACD supervisor with enhanced display of status information including the graphical display of agent locations. Greater efficiency in supervising and conducting the ACD operations is also achieved using predictive abandonment to predict the pending loss of calls to react accordingly.

SUMMARY OF THE INVENTION

The present invention relates to an agent supervising apparatus for a telephone system having a plurality of telephone stations assigned to a plurality of agents for handling a plurality of telephone calls. The agent supervising apparatus comprises an agent supervising station including a display and an input device; a locating network including a plurality of remote units transmitting corresponding identification information; a plurality of remote transceivers for detecting the identification information and for generating corresponding detection signals; and a central processing station responsive to the detection signals for generating location information corresponding to the location of the remote units; and a processing unit is included in the agent supervising apparatus having associated memory and stored programs responsive to commands from the input device and to the location information, for generating and displaying on the display a graphic indicating the location information.

The agent supervising apparatus has at least one remote unit which is physically attachable to each respective agent. The agent supervising apparatus has a central processing station which sends locating information to the processing unit through a private branch exchange (PBX). The graphic includes a directory listing each remote unit and corresponding location information.

The agent supervising apparatus includes memory storage of map graphic data, and the graphic is generated from the map graphic data and alternatively includes a map representation having a portion of the identification information positioned in the map representation corresponding to the location information. The agent supervising apparatus also has telephone stations and remote transceivers located in a geographic region with the map representation depicting corresponding locations of the geographic region.

BRIEF DESCRIPTION OF THE DRAWINGS

The features of the present invention will become more readily apparent and may be better understood by referring to the following detailed description of an illustrative embodiment of the present invention, taken in conjunction with the accompanying drawings, where:

FIG. 2 shows a group activity screen;

FIG. 2A shows a Dynamic Screen Profile Edit Screen;

FIG. 3 shows an agent directory screen;

FIG. 4 illustrates an alternative agent directory screen;

FIG. 5B shows a Time Interval for Color Alarm screen;

FIG. 8 illustrates a directory screen listing agent locations;

DETAILED DESCRIPTION OF THE PREFERRED EMBODIMENTS

Figure 1:
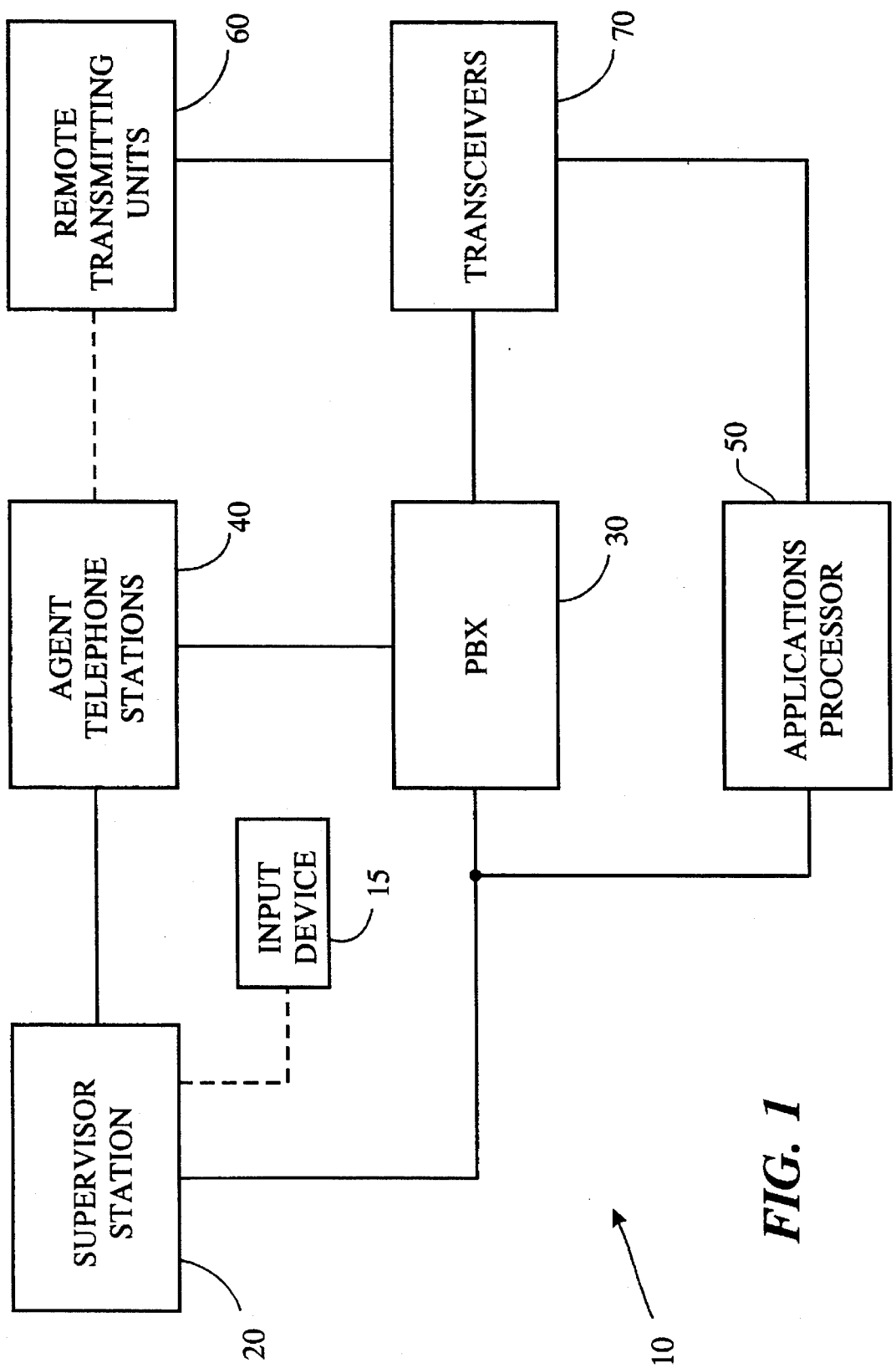
FIG. 1 shows the configuration of the supervising system of the present invention.

Referring now in specific detail to the drawings, with like reference numerals identifying similar or identical elements, the present invention comprises an agent supervising system 10 for use with a telephone system employing ACD and optionally for use with a locating system. As shown in FIG. 1, the agent supervising system 10 includes a supervisor station 20 interacting with programs executed by a private branch exchange (PBX) 30 controlling automatic call distribution (ACD) in a telephone system having a plurality of telephone stations 40 and also interacting with programs executed by an applications processor 50. The supervisor station 20 includes a display and input devices 15 such as a keyboard and/or a mouse. The display is preferably a color monitor capable of outputting a plurality of distinct colors for text in foregrounds and various background palettes to highlight the text. In a preferred embodiment, the supervisor station 20 and the agent telephone stations include an ISOETEC™ terminal available from EXECUTONE® Information Systems, Inc., but other terminals having equivalent display characteristics may alternatively be employed. Separate telephone devices having handsets and/or headsets may also be included in the supervisor station 20 and in each agent telephone station 40 for telephone operations.

The PBX 30 is a digital telephone switching system which handles call processing, call queueing, call routing, voice announcements and other voice related functions. The PBX may be 68000 processor based and includes a real time clock, EPROM memory to store the operating system of the PBX 30 and battery-backed static RAM software routines to store operational data and information including system configuration and location information.

The PBX 30 preferably utilizes time division switching techniques and pulse code modulation (PCM) and provides a capacity of 432 ports which may be configured as 420 phones and 12 trunks, or 12 phones and 420 trunks or any combination in between. The capacity is upgradable with additional PBXs. The PBX 30 has a voice data bus divided into time slots with each port provided a time slot. This time slot arrangement provides a telephone system which is non-blocking between ports. In addition, the PBX 30 has a user data bus independent and parallel of the voice data bus, allowing for simultaneous voice and user data operation.

The PBX 30 preferably provides four I/O ports on a main distribution frame (MDF). Ports 1 and 2 are configured for RS-232 type connections and each of ports 1 and 2 has a default baud rate of 9600 baud. Data information can be switched through the PBX 30 at speeds from 300 to 38.4K baud. The PBX 30 is preferably transparent to the connected devices, and no protocol or data speed conversion is necessary; i.e. any compatible serial data communications devices can communicate through the PBX 30. In the present invention, the PBX 30 is preferably an IDS™ telephone system available from EXECUTONE® Information Systems, Inc.

The applications processor 50 generates and stores data reflecting call activity of the agent telephone stations 40 assigned to agents operating within the ACD. The applications processor 50 executes application software with a UNIX® based operating system. The applications processor 50 performs storage, coordination and control functions such as providing menus and graphic windows for accessing and generating statistical reports, and the applications processor 50 responds to commands from the supervisor station 20 to display the statistical reports to the supervisor.

The applications processor 50 includes, in the preferred embodiment, an INTEL® 386-based central processing unit (CPU). For memory, the applications processor 50 has 8 Megabit (MB) RAM, a 540 MB hard or fixed disk drive, a 3.5 inch 1.44 MB floppy disk drive, and a 120 MB internal tape drive. The capacity of each of the memory devices is expandable. Disk drive and tape drive controllers are provided. A VGA video board included in the applications processor 50 operates the video graphics of the supervisor station 20 and the agent telephone stations 40 in the telephone system. Alternatively, each agent telephone station and the supervisor station 20 includes an individual VGA video board to generate graphical displays such as user menus for facilitating the use of the telephone system by the agents and by the supervisor.

The applications processor 50 is coupled through an interface board including an RS-232 type connection to the MDF of the PBX 30. The interface board is preferably a 16 channel serial interface I/O driver board designed to connect multiple terminals including the supervisor station 20, printers, modems, or other RS-232 compatible peripheral devices.

The agent telephone stations 40 are assigned to each agent and include at least a telephone. The ACD system in the telephone system according to the present invention is suitable for operation in telemarketing environments. The agent telephone stations 40 may further include a computer terminal with a display and an input device such as a keyboard for inputting and displaying information regarding the calls being handled or to be handled. Such agent telephone stations 40 may further include a telephone headset to free the agents' hands for inputting data.

The agents are grouped in ACD groups; i.e. groups of agents having predetermined instructions or manner of addressing inbound or outbound calls. For example, as inbound calls arrive, they may be queued until an agent becomes available to address the queued calls. Some agents may be further assigned to "splits", which are sets of agents having a predetermined manner for handling an inbound call when other groups of agents are unavailable to address the inbound call. The agents may also alternate between handling inbound and outbound calls, and inbound/outbound call management and predictive dialing techniques may be implemented as described further in the U.S. patent application Ser. No. 08/123,309, incorporated by reference above. The status of the calls and the agents can be monitored by the supervisor station 20, and the supervisor may also answer or conduct inbound or outbound calls through the supervisor station 20.

Figure 2:
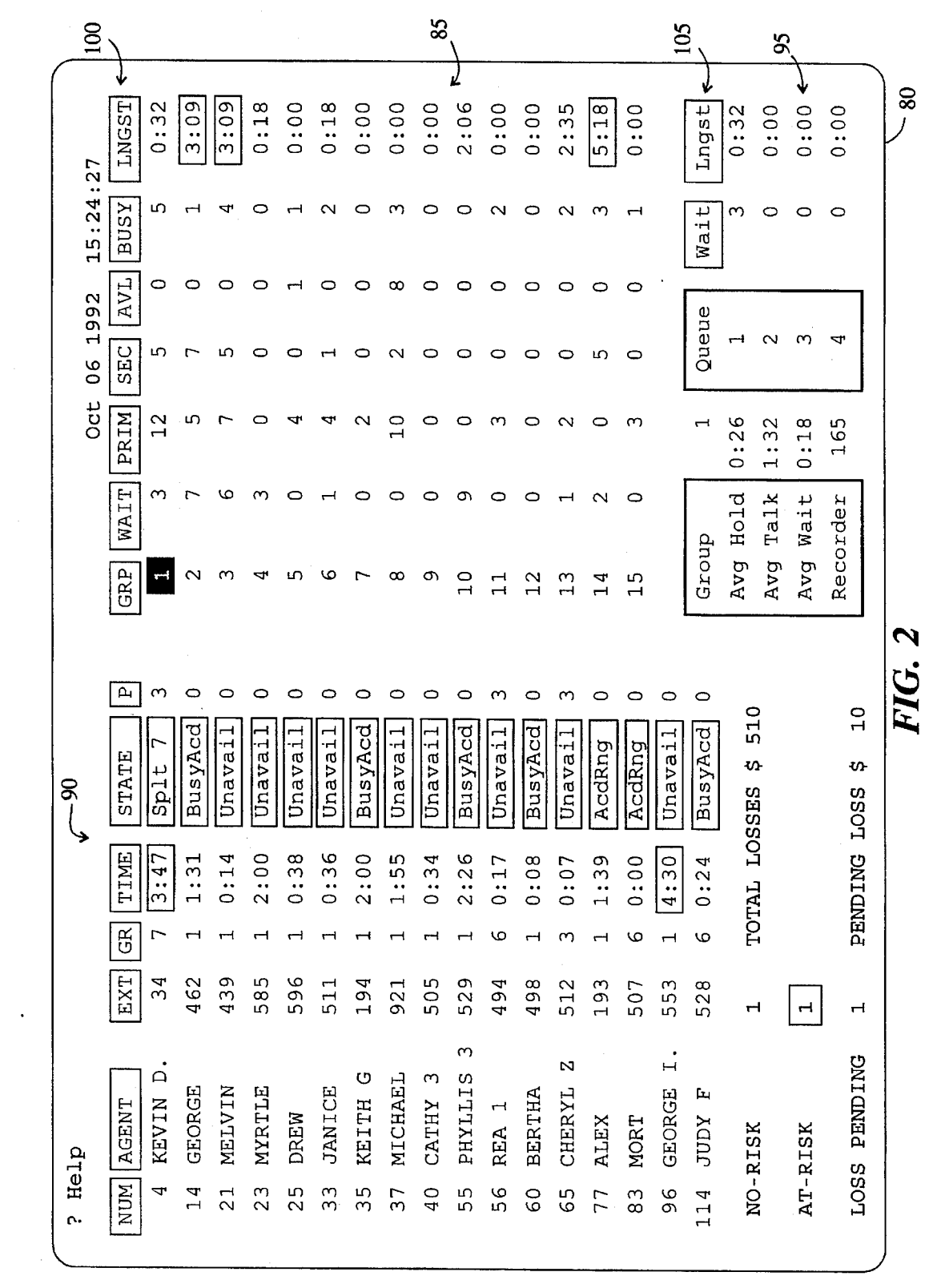
Figure 5:
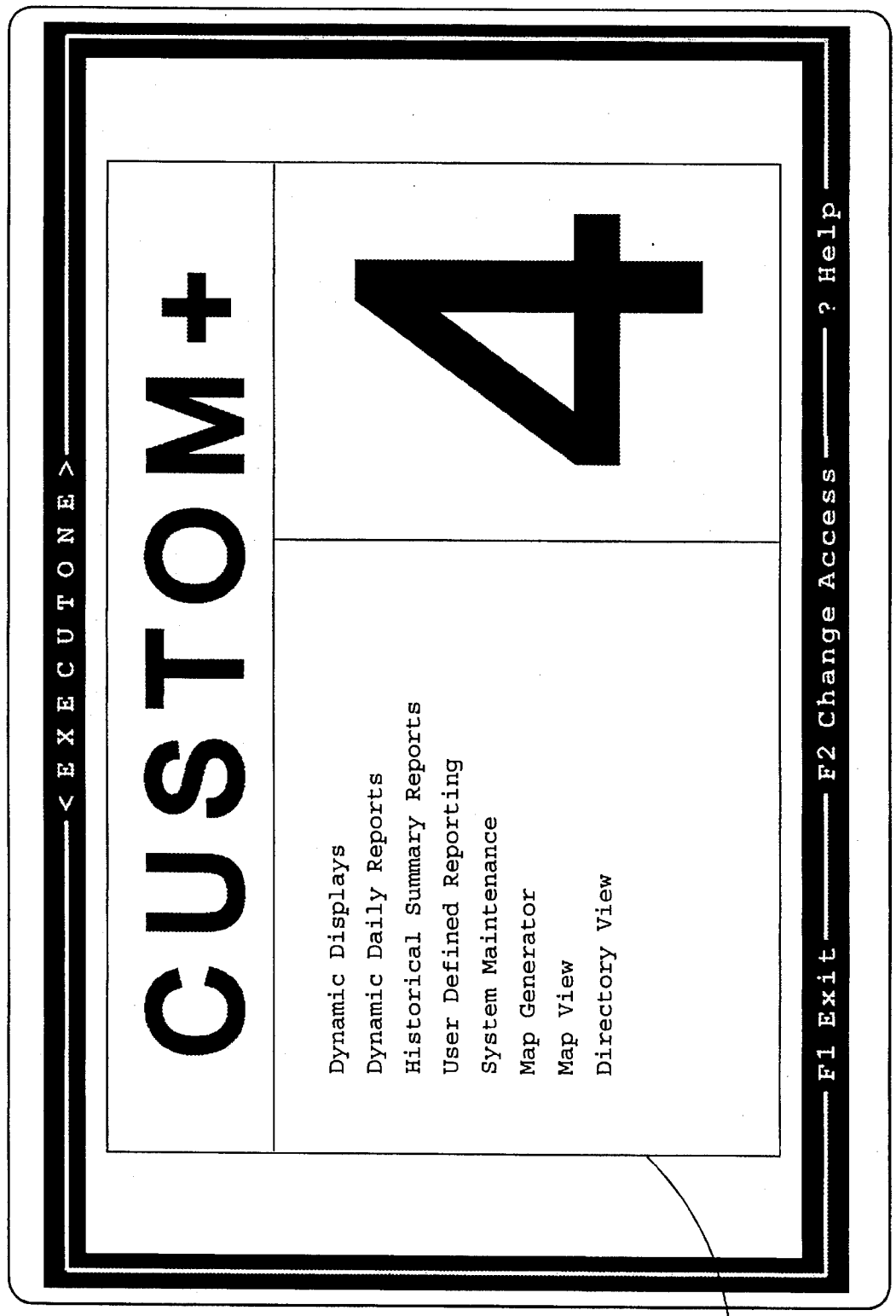
FIG. 5 illustrates a main supervisor menu screen.

FIG. 2 shows an activity/group dynamic display screen 80 which may be accessed by the supervisor through the supervisor station 20 upon the supervisor's entering an input command for selecting the Dynamic Displays when the Main Menu Screen 130, shown in FIG. 5, is displayed on the supervisor's display. This display provides information in a Group Area 85, an Agent Area 90, and a Summary Area 95 on the display. The upper right portion of the screen is allocated as the Group Area 85 to display up to 16 groups. The following information is available for each group:

GROUP A line of information is represented for each group.
WAIT The number of calls waiting to be answered by an agent is listed for each group. This number should be kept as close to zero as possible. As the number of calls begins to rise, the supervisor should make certain that as many agents as possible are addressing the inbound ACD calls. If all agents are in fact on available inbound ACD calls, and the number of calls waiting to be answered is still high, the supervisor may consider temporarily assigning more agents to the group.
PRIM The number of agents available within the displayed group.
SEC The number of agents available from other groups.
AVL The number of agents who are free to receive inbound ACD calls. This number should be kept as close to zero as possible; i.e. all agents should be handling calls. An available agent is waiting for a call to arrive, or performing work that can be interrupted.
BUSY The number of agents that are on inbound ACD calls. This number should be kept as close as possible to the number of agents logged in. If the number of busy agents plus the number of available agents does not equal the number of agents logged on, a quick look at the Agent area (or the Agent Detail Dynamic Display described below) shows which agents are unavailable to take calls and also shows the reasons why the agents are unavailable.
LNGST The amount of time the oldest ACD call has been waiting to be answered. This number should be as low as possible. This number reflects how long the customers have been kept waiting.

The left portion of the Group Dynamic Screen 80 is allocated as the Agent Area 90 to display the current state of each agent in the displayed group, using the following format:

NUM The information on each line corresponds to the agent number listed in this column. The agents are listed sequentially by agent number beginning with the lowest number.
AGENT The name of the agent assigned to each of the Agent Numbers is listed in this column. This name is entered during system setup on an ACD Agent Setup screen.
EXT The extension number of the telephone where the agent is currently logged in. Only the last 3 digits of the extension number are displayed.
GR (or a number) Indicates the primary group currently being viewed or the number of the agent list displayed.
TIME This column is used in conjunction with the STATE column to indicate the amount of time an agent has been in the STATE listed.
PRI or P Indicates the agent is in a primary SPLIT call.
STATE The current activity of the ACD agent's telephone is listed as text in a light blue foreground in this column.

The lower right portion of the Group Dynamic Screen 80 shows the Summary Area 95 which is devoted to the same group and displays:

Avg Hold The average time calls were on hold after being answered by an agent.
Avg Talk The average time agents spent talking on ACD calls.
Avg Wait The average time calls waited in queue.
Recorder The Recorder field lists the total number of calls sent to a recording.
Wait Lists how many calls are in queue for each of the above four priorities; i.e. Avg Hold, Avg Talk, Avg Wait, and Recorder.
Lngst Lists how long the oldest call in queue has been waiting for each of the above four priorities.

The agents are further categorized into agent lists; i.e. independent collections of specified agents separate from the ACD groups for customized monitoring by the supervisor. Therefore, an agent may be assigned to an ACD group as well as an agent list. For example, agent lists may be composed of marketing agents, agents solely dedicated to handle a blood drive, inbound agents for inbound calls, outbound agents for outbound calls, inexperienced or rookie agents for specialized supervision by the supervisor, etc.

Referring to FIG. 2A, a Dynamic Screen Profile Edit screen 106 is displayed on the supervisor's display upon input of a predetermined input command from the supervisor; for example, when a supervisor enters a system maintenance command through the Main Menu screen 130 shown in FIG. 5 by moving a cursor by keyboard inputs or by mouse, to the words "System Maintenance" and pressing the Return key or pressing an appropriate mouse button.

Using the Dynamic Screen Profile Edit screen 106, a supervisor selects and customizes groups to be displayed on the left side portion of the activity/group dynamic screen 80 shown, for example, in FIG. 2. Upon displaying the Dynamic Screen Profile Edit screen 106, the supervisor may add, change, or delete the groups displayed in FIG. 2 and then save the changed group settings in memory.

Figure 5A:
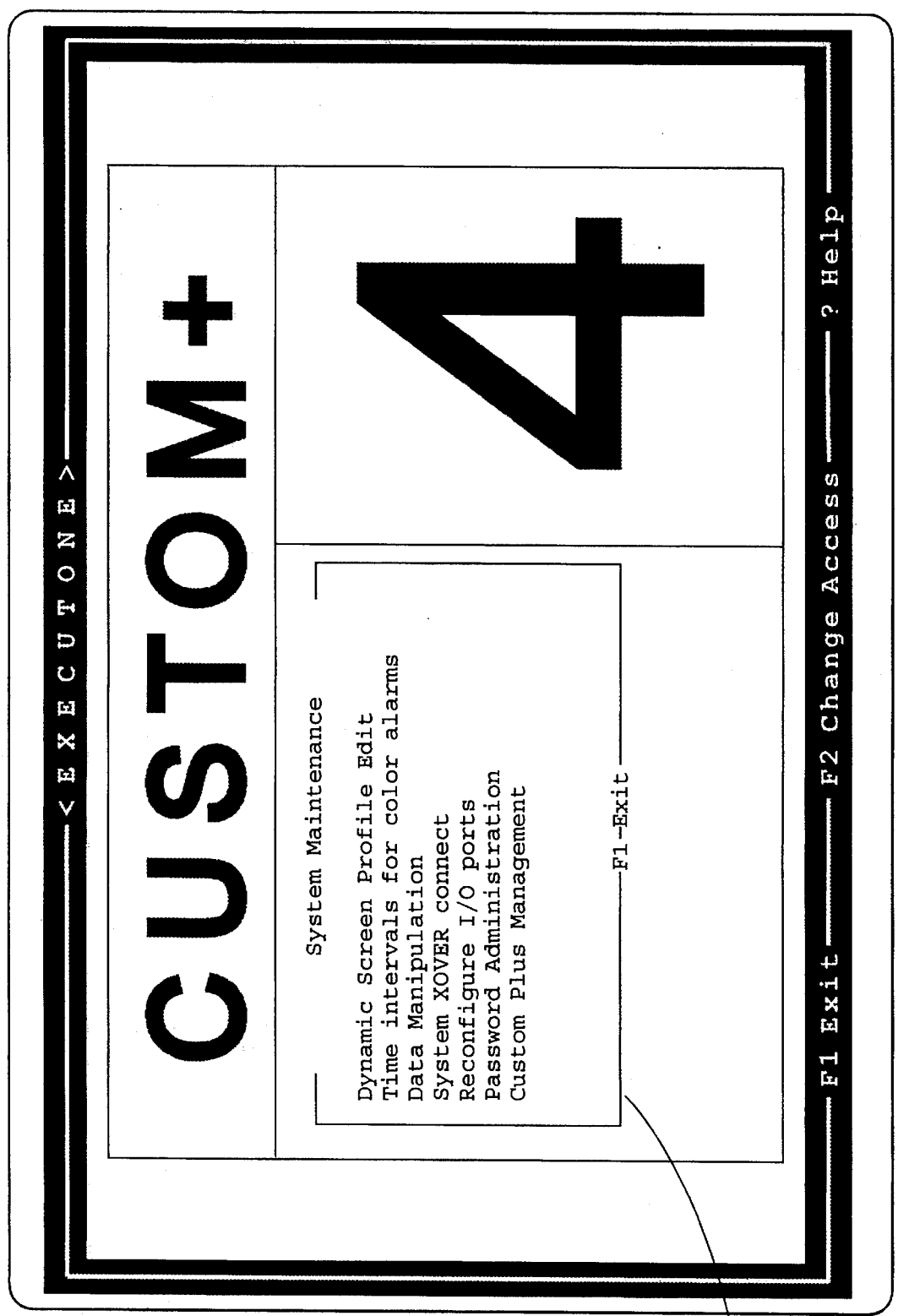
FIG. 5A shows a System Maintenance Screen.

Similarly, from the Dynamic Screen Profile Edit screen 106, the supervisor may add, edit, or delete agents in agent lists. In the preferred embodiment, up to four agent lists may be defined for each supervisor, and each agent list may have up to 24 agents assigned for dedicated duties; for example, blood drives as described above. FIG. 5A shows a System Maintenance screen 131 for accessing, for example, the Dynamic Screen Profile Edit screen 106 shown in FIG. 2A.

In addition, the agent supervising system of the present invention further includes "Exception Color Graphics"; i.e. color graphics which change as new states or thresholds are attained to alert the supervisor of the status of the agents and the handling of ACD calls. The various distinct colors thus provide the supervisor with visual indications of the agents' status which are more readily apparent than the status indicated by the text. The "Exception Color Graphics" are implemented in software which stores agent and call information in memory to track each agent and call to respond to the states or thresholds as configured by the supervisor or as set by default.

Through the Dynamic Screen Profile Edit Screen 106 shown in FIG. 2A, the thresholds for the "Exception Color Graphics" for the groups displayed on the left side portion of FIG. 2 may be set and changed by selecting WAIT (the number of calls waiting for an agent to address the call) or LONGEST (the length of the oldest call waiting in a call queue).

Referring again to FIG. 2, each agent state in the STATE column in the Group Area is displayed in a screen section, which is herein defined as a portion of the screen containing text and backgrounds having various colors. Each screen section for a corresponding agent state has its own background color according to the following color codes:

Avail green background. The agent is available for a call.

Unavail magenta background. The UNAVAILABLE key on an agent's telephone has been activated. The system does not attempt to route ACD calls to this agent.

AcdRng white background. An ACD call ringing an agent's extension.

Wrap Up yellow background. The agent has completed a call, and is now in the programmed wrap up time. This time is usually set aside to complete any work pertaining to the previous call.

FrcWrap yellow background. The agent has completed a call, and is now in the programmed wrap up time. The system is waiting for the agent to enter a qualification code. The system keeps the agent in this state until a qualification code is entered. No ACD calls are routed to the agent in this state.

BusyAcd black background. The agent is currently talking on an ACD call.

BusyOut light blue background. The system attempted to route a call to this agent, but the agent did not answer the call within the prescribed time on an ACD Group Setup screen. The agent position remains in this state for the time specified on the ACD Group Setup screen.

Login yellow background. This state appears briefly while an agent is in the process of logging in.

Icm In magenta background. The agent received an internal call.

Coin light blue background. The agent received an outside line (non-ACD) call.

IcmRng magenta background. An internal call is ringing the agent's telephone.

CoRng black background. An inbound non-ACD call is ringing the agent's telephone.

Dnd magenta background. The agent is in the work (ACD DND) state. ACD calls are not routed to an agent in this state.

Split yellow background. The agent is performing a task in an ACD group other than the one displayed. Split is followed by a number indicating the ACD group in which the agent is active. The display must be switched to this group in order to determine the exact state of the agent.

IcmOut magenta background. The agent placed an intercom call.

CoOut light blue background. The agent placed an outgoing outside line call.

Referring again to FIG. 2, the displayed Group Dynamic Screen 80 has rows 100, 105 of screen sections constituting headings with text in these rows 100, 105 displayed as a dark blue foreground against a white background. Except as noted below, the remainder of the screen has text displayed in a light blue foreground against a dark blue background. As per the color coding listed above, a screen section in the STATE column has a yellow background further indicating that Kevin is in split 7, and other screen sections in the STATE column have white backgrounds further indicating that Alex and Mort have ACD calls ringing with other screen sections similarly indicating the status of each agent listed according to the above color coding.

Therefore, a supervisor may readily identify the agents who are unavailable, who are busy with an ACD call, etc. by scanning for the distinctive colors of each color code. Also, scanning for specific colors provides the supervisor with a rough estimate of the number of agents within a specific state according to the corresponding color. Thus, an inordinate amount of magenta screen sections reflecting many unavailable agents alerts the supervisor to act accordingly.

The "Exception Color Graphics" of the present invention also includes color alarms to monitor the activities of a group, a split, or a collection of agents in near real-time. These color alarms have two alarm states: yellow and red; and the color alarms are set by default which may be reconfigured by the supervisor. Using color alarm setup menus, various TIME thresholds for the system and for each agent group and agent list may be set between 0 seconds and 3600 seconds (1 hour). When a threshold has been exceeded, the background of a screen section within the TIME column in the Group Area shown in FIG. 2 changes to the corresponding color. Each agent state may be programmed separately, and each group, split, or list of agents may also be programmed separately. For example, a first alarm threshold of 180 seconds (3 minutes) and a second alarm threshold of 240 seconds (4 minutes) may be set to highlight an agent's duration in an indicated state with the agent's duration listed in the TIME column. The highlighting is displayed by time durations which exceed these set thresholds having yellow or red backgrounds, respectively in corresponding screen sections. Thus, in FIG. 2, the screen section showing Kevin's time in the WrapUp state would have a yellow background and the screen section showing the time that George I. is unavailable would have a red background.

Also, thresholds may be set independent of the TIME thresholds for the oldest call in a queue exceeding a specified time, thus color highlighting the corresponding time in the LNGST column to alert the supervisor of excessively delayed responses to waiting calls. For example, a first alarm threshold of 180 seconds (3 minutes) and a second alarm threshold of 300 seconds (5 minutes) may be set to highlight longest call times exceeding these thresholds with yellow or red backgrounds, respectively. Thus, in FIG. 2, the screen sections in the LNGST column showing 3:09 minutes would have yellow backgrounds and the screen section showing 5:18 minutes would have a red background.

When 50% of the value entered for each threshold is reached, the background color of the corresponding screen section or field on the Group Dynamic Screen 80 changes to yellow. When the value entered for each threshold is exceeded, the corresponding background color changes from yellow to red.

For the state of each agent in each group or agent list, color alarms are also available to highlight the duration of each agent in the displayed state. Each threshold may be individually customized by the supervisor through a Time Intervals for Color Alarms screen 132 shown, for example, in FIG. 5B which is accessed by selecting "Time Intervals for Color Alarms" at the System Maintenance screen 131 shown in FIG. 5A. As shown in FIG. 5B, time intervals for color alarms may be configured for each group, for each agent list, or for the entire system, and the configured color alarm settings are saved in memory. Default thresholds having a default yellow/red transition at 50% are shown in the right side portion of the exemplary screen in FIG. 5B.

The group, split, or agent list displayed on the supervisor's display determines the thresholds controlling the display of the color alarms. For example, for a first group, WrapUp may be programmed to change the displayed agent's time to have a yellow background in 10 seconds and a red background in 20 seconds, while for a first agent list, WrapUp may be programmed to have the agent's time turn yellow in 30 seconds and red in 60 seconds. The first agent list may be used to view, for example, rookie agents. In this example, if an agent in the first group and also in the first agent list is in WrapUp for 25 seconds, a supervisor viewing the first group shows the agent's time in WrapUp as having a red background. However, if the supervisor views the first agent list, the same agent's time is shown with a normal blue background, and the background color of the agent's time will not change to a yellow background for another 5 seconds.

The combination of the display lists as in the exemplary screen in FIG. 2 and the "Exception Color Graphics" for state changes and color alarms allow a supervisor to tailor their display to accomplish multiple tasks. For example, a number of relatively new agents may be placed in a separate agent list and the corresponding color alarms for their agent list may be set relatively high compared to the more experienced agents in other lists, allowing the inexperience of the newer agents to be taken into account automatically by the agent supervising system programmed by the supervisor.

In another example, for a telemarketing campaign having both inbound and outbound agents addressing inbound and outbound calls, respectively, the present supervising system using the above described "Exception Color graphics" and color alarms visually alerts the supervisor to redesignate agents from being outbound to inbound or vice versa dynamically according to the current needs of the telemarketing campaign. For example, if the number of inbound calls increases and the supervisor using the present supervising system sees that the inbound agents are unavailable or busy with other calls, the supervisor may change some outbound agents to inbound agents to address the excess inbound calls.

The agents may be listed in a directory view screen 110 as in FIG. 3 showing their telephone extension and the designation of their assigned agent telephone station. Such designations may include a telephone station identification number unique to each agent telephone station; a type of agent telephone station, such as "supervisor", "inbound", or "outbound"; a location description or location code corresponding to the position of each agent telephone station in the facility or equivalent visual designations. In addition, referring again to FIG. 2, their current status may be displayed on the directory view screen 110 in FIG. 3 and automatically updated using color alarms and "Exception Color Graphics" as described above. Thus, screen sections in the STATE column have light blue text and background colors according to the color coding described above.

In an additional embodiment illustrated in FIG. 4, the directory view screen 122 may provide an agent search facility to access and display a specified agent. A supervisor enters the agent's name at screen section 122 and the agent supervisor system displays a screen section 124 having the accessed agent's name, phone extension, and location with white text and with a dark blue background to distinguish the accessed agent from other listed agents.

The various display screens, statistical and historical report screens, and other functions available to the supervisor are accessible through the main supervisor menu 130 as shown in FIG. 5. Software routines generate and manage the various menus and displays as shown in FIGS. 2–4, allowing the supervisor to access the desired information. The operation of the telephone system and other software implemented routines are described in more detail below with reference to accompanying FIGS. 9–11.

The present invention alternatively includes a map display generator accessible from the main supervisor menu 130 shown in FIG. 5 for allowing a supervisor to generate a map representation of the office or facility to show where the agents and their assigned telephone stations are located.

Figure 6:
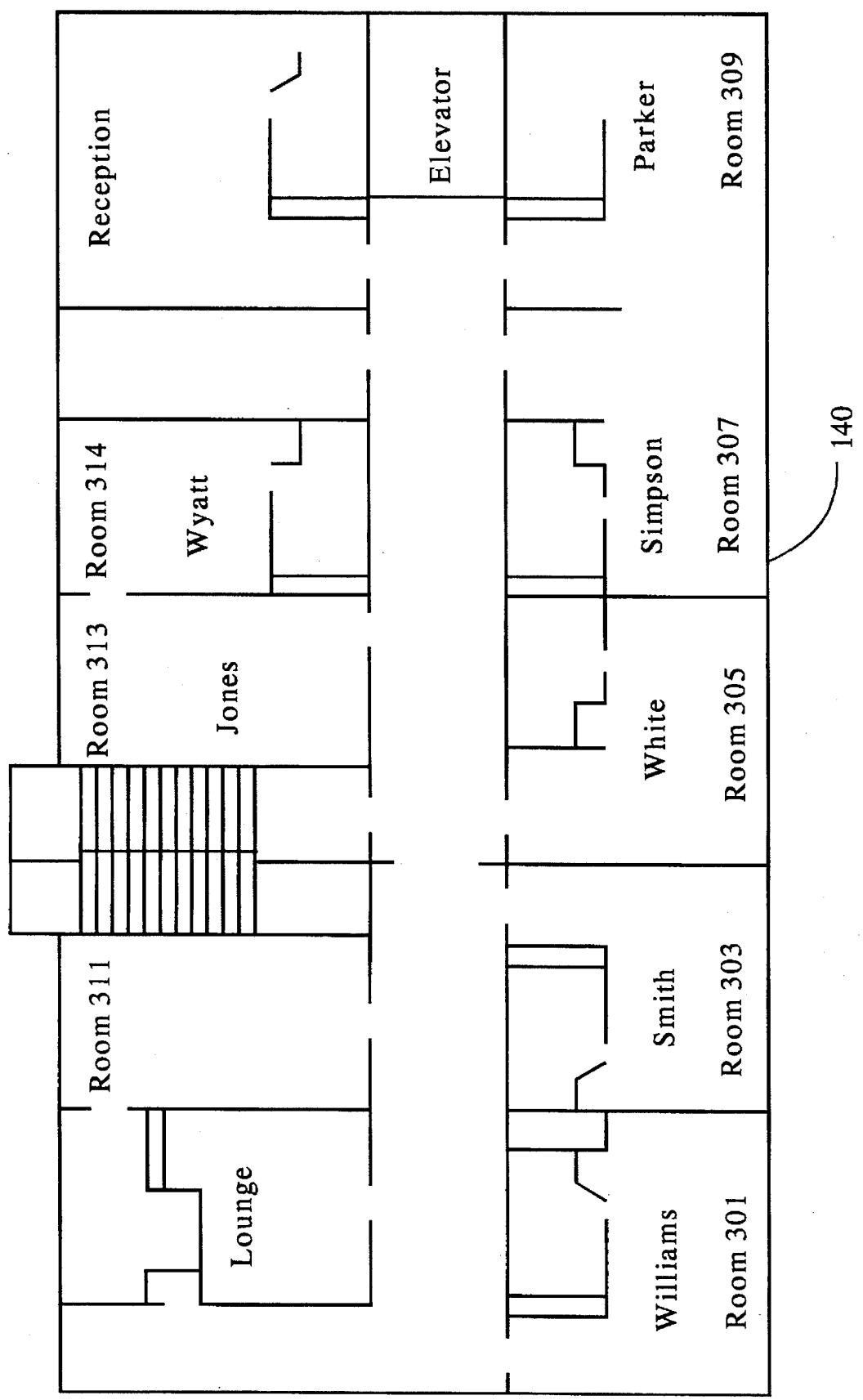
FIG. 6 shows a map screen having agent and office information.

FIG. 6 shows an example of a map screen or map view of a graphic representation 140 of the ACD facility. The map view screen is essentially a bit-map representation of the ACD facility. The bit-map data is preferably stored in associated memory during initialization of the supervisor system. Once the map representation 140 is generated to provide a substantially accurate depiction of the ACD facility; for example, an office, the supervisor may then list the agents at their corresponding telephone station locations on the map screen by agent name, abbreviation, or other designation, such as icons or figures, as shown in FIG. 6. The final map representation 140 having agent designations is then saved in memory in the applications processor 50. Changes in personnel or modification of agent locations may be edited at any time.

Figure 7:
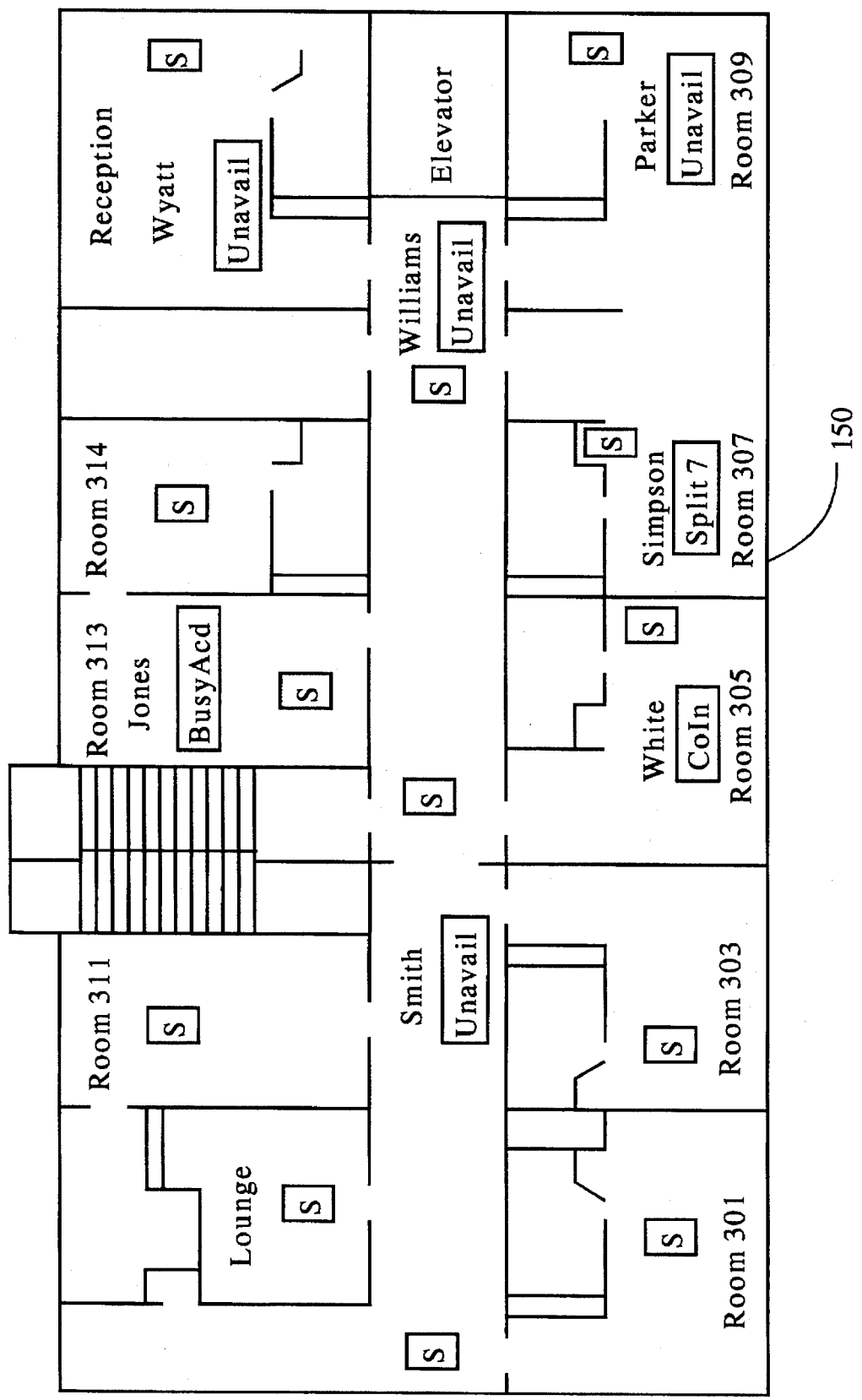
FIG. 7 shows a map screen showing agent status information and agent locations.

The information shown in the group activity screen of FIG. 2 and the directory view screens of FIGS. 3–4 including the agents' call status information may be displayed in respective agents' map area; i.e. a portion of the map view screen in which each agent is represented by their name or other designation. "Exception Color Graphics" may be employed in a map view screen as illustrated in FIG. 7 according to the color codes described above. Thus, using the map view screen and "Exception Color Graphics", the supervisor may efficiently monitor the call operations of the ACD and the agents at the supervisor station.

Figure 13:
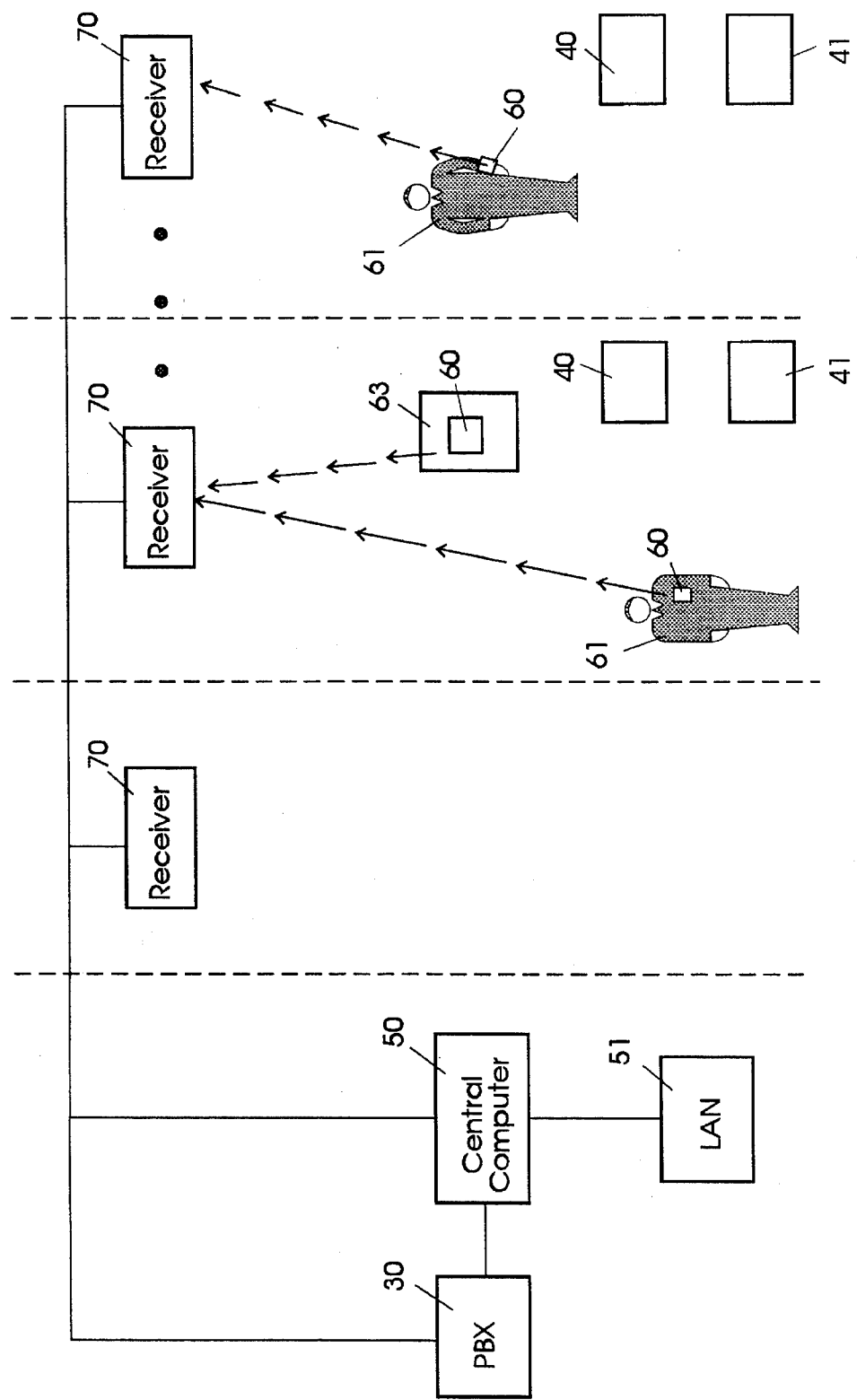
FIG. 13 illustrates the elements of the locating network according to the present invention.

In another preferred embodiment, the agent supervising system is alternatively coupled to a locating system. As shown in FIGS. 1 and 13, the locating system comprises a plurality of remote transmitting units 60 such as transmitting badges which are attachable to personnel 61 or objects 63.

Each remote transmitting unit 60 is assigned to each agent and is therefore associated with a corresponding agent telephone station 40 of each respective agent, as represented by the dotted line in FIG. 1. As shown in FIG. 13, each agent telephone station 40 may have an associated telephone 41. The badges transmit information including badge identification through a communications channel to a central receiver of the locating system, which is preferably the PBX 30. The applications processor 50 may be a central computer operatively connected to a local area network (LAN) 51 which in turn may be connected to the agent telephone stations 40. The communications channel may include transceivers 70 which receive the badge transmissions and relay the badge signals. In the preferred embodiment, the transceivers 70 and remote transmitting units 60 communicate using infrared (IR) signals. The transceivers 70 may further communicate with the central receiver via dedicated wires or cables. Alternatively, the individual telephone stations may include a sensor for receiving the badge transmissions and circuitry for relaying the badge information to the PBX 30.

The plurality of transceivers 70 or sensors are disposed spatially apart throughout the ACD facility. Each transceiver 70 receives signals transmitted by the remote units such as badges which are within the transceiver's range of reception. Each transceiver 70 is identifiable by PBX 30. The remote transmitting units 60 are worn by facility personnel and may be attached to objects such as facility equipment which may be mobile, commonly used, but in short supply; for example, hand held computers. Each of the remote transmitting units 60 transmits signals including an individually unique identification at selected intervals. The signals are received by the most proximal transceiver and the transceiver in turn communicates the received information to the PBX 30. The PBX 30 includes in its memory data identifying each remote transmitting unit 60 in operation and information regarding the object or person associated with each remote transmitting unit 60. The PBX 30 receives messages from each transceiver at selected intervals. The messages include information last received by each of the transceivers 70. The PBX 30 processes the messages received from the transceivers 70 and substantially continually updates the location of each remote transmitting unit 60 and its associated person or object within the facility. Location identification information may be retrieved from the PBX 30 by inquiring by badge identification, personnel name, and/or receiver identification. The PBX 30 may respond with the most recently updated information or respond with a history of location information from its memory. For example, a report on who visited a room, when and for how long.

The locating system updates the location information preferably every one second, and the remote transmitting units 60 may be set to transmit an identification signal nearly continuously or at regular intervals for the locating system to update their locations in near real time. The identification information is sent from the transceiver 70 of the locating system to the PBX 30 of the agent supervising system. The applications processor 50, using the stored programs in response to the choices of the supervisor input at the supervisor station 20, determines what information to present on the display of the supervisor station 20.

The PBX 30 couples to the plurality of transceivers 70 and to a plurality of agent telephone stations 40 throughout the facility, e.g., telephones and agent terminals. The system configuration as shown in FIG. 1 facilitates direct communication of the transceivers 70 with the PBX 30. The transceivers 70 may also communicate with the applications processor 50 through the PBX 30 or communicate with the PBX 30 through the applications processor 50. The system as configured allows the flexibility of processing and transferring the information received from the transceivers 70 by the PBX 30 or shared processing and transferring responsibilities between the applications processor 50 and the PBX 30. For example, the PBX 30 may store the information such as the identity and location of each transceiver 70. When a message is received by the PBX 30 from a transceiver, the PBX 30 adds the transceiver identity or location information to the message.

Another exemplary use of the system is the location of personnel with the telephones. For example, one may locate personnel by dialing the ID of personnel on a telephone at an agent telephone station or anywhere in the facility. The PBX 30 receives the call from the telephone and inquires as to the location of personnel by retrieving the location information of personnel and identifies that the located personnel are at the location associated with transceiver 70. The PBX 30 responds to the call with the location information. The PBX 30 in turn dials the telephone of the person accessing the personnel location information, which may be equipped with a display and a speaker for announcing or displaying the name of personnel. Additional features are described in more detail in U.S. application Ser. No. 08/087,394, incorporated above.

Using the map generating facility accessed through the main supervisor menu shown in FIG. 5, the supervisor can modify the generated map in FIG. 6 to position depictions of the transceivers 70 on the map screen as shown in FIG. 7 corresponding to the actual positions of the transceivers 80. For example, as illustrated in FIG. 7, each transceiver or sensor may be shown as an "S" in a box, but any other icon or description may be used to depict the transceivers 70. Other facility designations such as room numbers or names are also entered in the map view screen. The supervisor then separately specifies transceiver information indicating the position of each transceiver relative to the locations in the facility; i.e. a specific transceiver is in a specific room number, room name, or facility area; e.g. in a hallway near room 303. The applications processor 50 stores the transceiver positions in memory and correlates the transceiver positions and agent identification information with the location information provided by the locating system. The transceiver depictions and agent representations are positioned on the map screen to display the general agent location relative to each transceiver.

When the map view screen is accessed by the supervisor from the main supervisor menu, the applications processor 50 uses the regularly updated location information of each remote transmitting unit to generate representations of each agent assigned to the corresponding remote transmitting unit on the map view screen. For example, as shown in FIG. 7, the agents may be shown by name, where the location of each agent is indicated by the position of the agent's name on the map view screen. Alternatively, agent's initials, distinctive icons, and/or colored icons may be used to identify each agent and each agent's location.

The agent supervising system 10 of the present invention may also provide a directory screen as shown in FIG. 8 showing updated location information of the agents assigned to each remote transmitting unit 60 using the regularly updated location information provided by the locating system. The information concerning an accessed agent may be highlighted as shown in FIG. 4.

Figure 9:
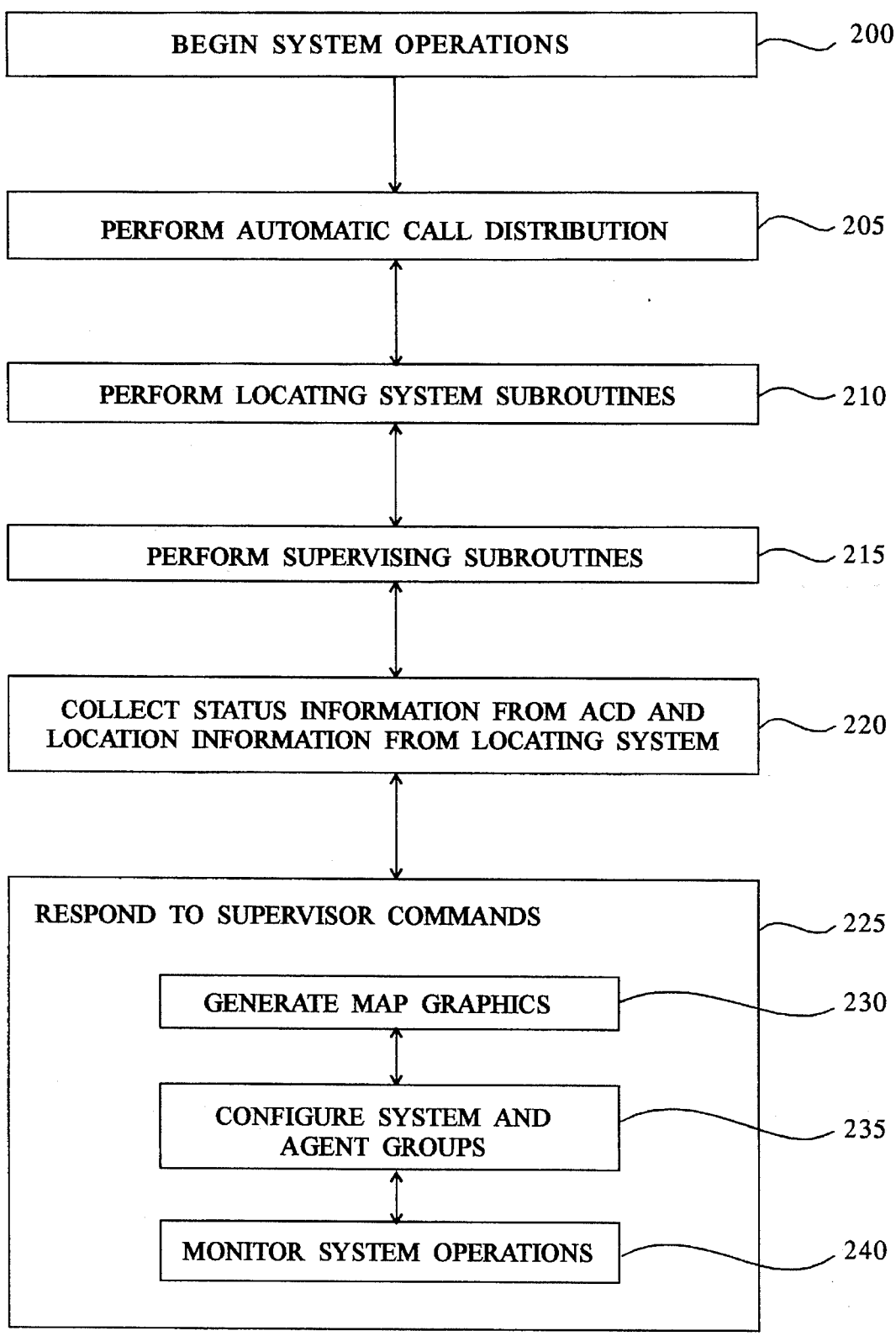
FIG. 9 illustrates a block diagram of the operation of the system according to the present invention.
Figure 10:
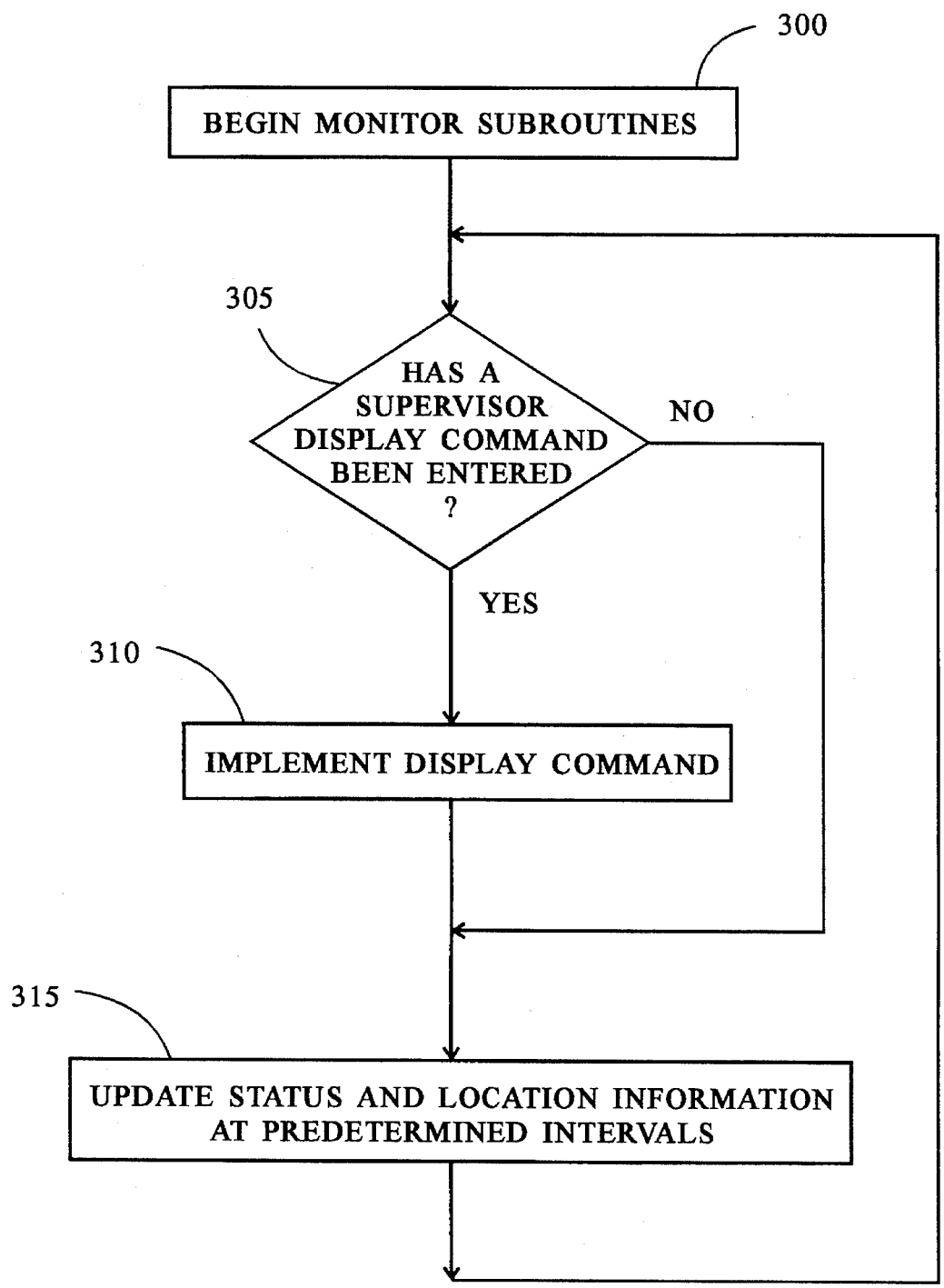
FIG. 10 illustrates a block diagram of a supervisor monitoring subroutine.
Figure 11:
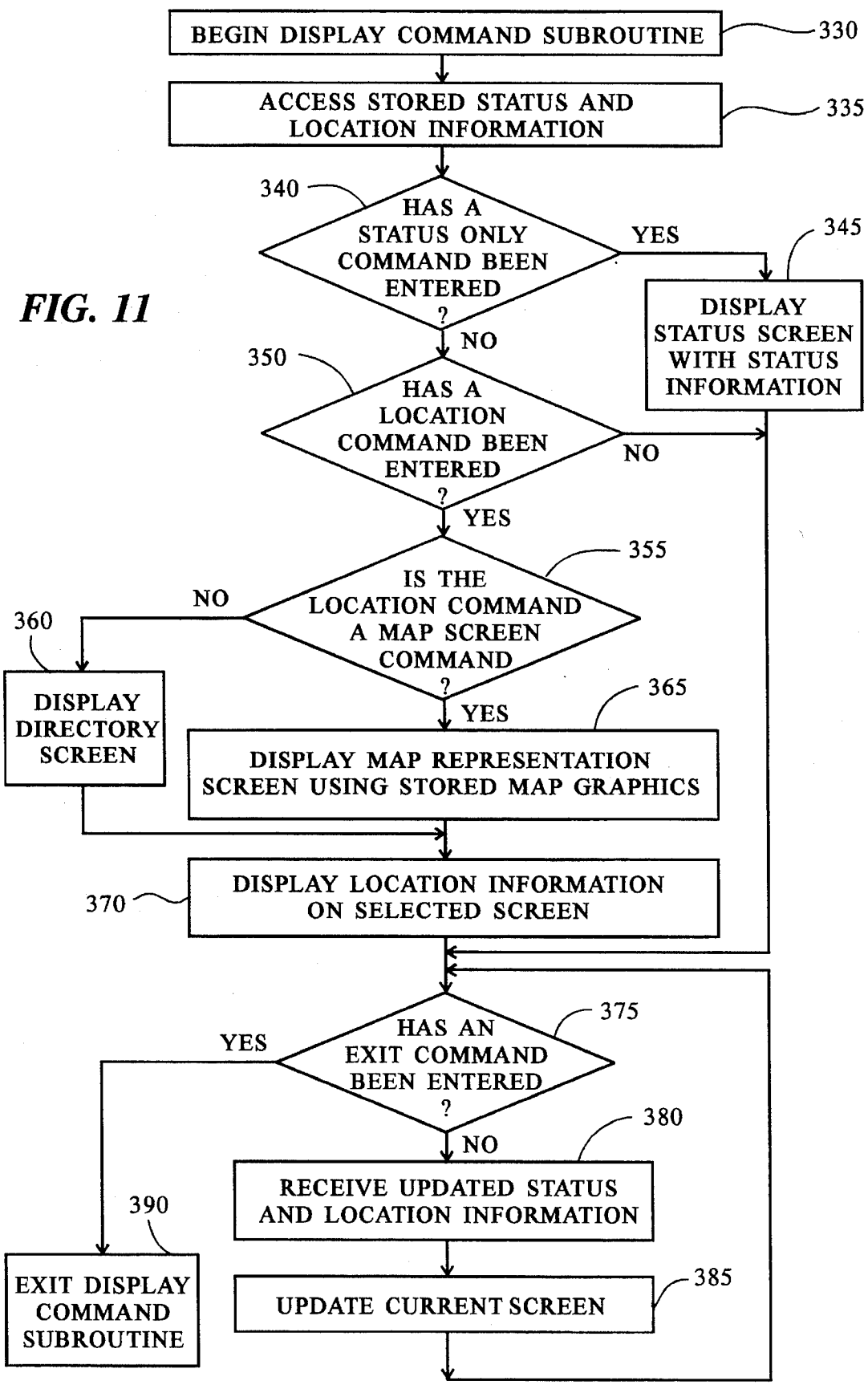
FIG. 11 illustrates a block diagram of a subroutine implementing display commands selected by the supervisor.

In use, the telephone system of the present invention operates according to the method shown in FIGS. 9–11. The present invention includes a method of operation of the telephone system, with the steps of operation shown in FIG. 9 including the steps of beginning system operations in step 200; performing automatic call distribution in step 205; performing locating system subroutines in step 210; performing supervising subroutines in step 215; collecting status information from ACD and location from locating system in step 220; and responding to supervisor commands in step 225. The steps 205–225 are performed concurrently during overall operation of the present invention. Step 225 further includes the steps of generating map graphics in step 230; configuring system and agent groups in step 235; and monitoring system operations in step 240, with each of steps 230–240 performed upon command from the supervisor through supervisor station 20 using the main supervisor menu shown in FIG. 5.

As shown in FIG. 10, step 240 of monitoring system operations includes the steps of beginning monitor subroutines in step 300; waiting for a supervisor display command to be entered in step 305; implementing entered display commands in step 310; and otherwise updating status and location information at predetermined intervals in step 315.

As shown in FIG. 11, the implementation of display commands in step 310 includes the steps of beginning a display command subroutine in step 330; accessing stored status and location information in step 335; and waiting for a display command to be entered in steps 340 and 350. If a STATUS ONLY command has been entered in step 340 (i.e. a command showing only agent and call status without location information), a status screen as shown in FIG. 4 is displayed in step 345 at the supervisor station 20 with status information. Otherwise, if a location command has been entered in step 350, it is either a map screen command or a directory screen command for displaying agent locations. If a map screen command was not entered in step 355, the directory screen as shown in the example screen in FIG. 8 has been chosen by the supervisor and is displayed in step 360. Otherwise, a map representation screen as illustrated in FIG. 7 is displayed using stored map graphics in step 365.

In response to receiving the map screen command in steps 350–355 in FIG. 11, the supervisor system executes step 365 to initiate a map view subroutine in the applications processor 50 to access the stored bit-map data in the associated memory of the applications processor 50. The map view is then displayed using bit-map display techniques known in the art to depict a map representation of the ACD agent area on the display.

For status update, the map view subroutine sends a message to the PBX 30 of the supervisor system requesting location and/or status information for each agent or personnel member, including designations corresponding to specific locations in the facility. The PBX 30 also functions as a server of the supervisor system and responds to the message by accessing the requested location and/or status information in associated memory in the PBX 30 and then sends the requested information to the applications processor 50.

Upon receiving the status information, the map view subroutine inserts the received status information relating to each agent at respective areas on the display corresponding to the agent's respective assigned stations.

Referring again to FIG. 11, for both the map screen and the directory screen, location information is displayed at appropriate locations on the selected screen in step 370. Until an exit command is entered by the supervisor in step 375, the subroutine receives updated status and location information from the PBX 30 at predetermined time intervals in step 380, and regularly updates the currently displayed screen in step 385.

For agent location update, the map view subroutine uses the received location information to display agent designations or agent icons at areas on the display corresponding to the location in the facility detected by the locating system.

The agent location update subroutine may be implemented by an object oriented technique. The objects of importance to the map view are: Monitor, MapView, SensorView, Sensor, Person, Area, and PersonGroup. The Monitor object is responsible for monitoring MapView objects, e.g., when a badge appears, disappears or moves. A Monitor object may have its view of the world restricted by associating a query string with that Monitor object. The restrictions may be, for example, one particular area or group of areas, one particular agent or group of agents, or any combination of the previous including multiple requirements such as agents on another floor and exclusions such as hiding display of equipment. The Monitor object may act only to pass the query string to the server. Upon initialization, a Monitor object sends a message to the server telling the server that it wants to know when any occurrences that match the query string occur. The server may respond to update requests with one of three possible responses: a valid badge has appeared in a valid location, a valid badge has left a valid location, or a valid badge has disappeared from a valid location. These messages are passed on to the Monitor object's display object. Preferably, the Monitor object requests an update from the server about every one second. If the query changes, the Monitor object closes the old monitor request to the server and creates a new one. When the Monitor object is destroyed the old monitor request to the server is closed.

The MapView object is the display object that manages the Map View window. It is associated on startup with an area ID for the map to be displayed and the area to be monitored. It creates a query string that restricts the monitor's view of the world to all badges seen within the area covered by the reception range of the transceivers. The MapView object collects the information received from the transceivers and displays the collected information in accordance with the badges within the area covered by the transceivers. The MapView object also creates one SensorView object for each transceiver contained within the area or sub area and adds to a list of SensorViews. When a BADGE APPEARED message arrives the MapView object finds the SensorView object that represents the transceiver which has last reported the detection of the badge transmissions and tells the SensorView object to add the badge to its list of associated badges. When a BADGE MOVE message arrives the MapView object finds the SensorView object that used to contain the badge, and tells the SensorView object to remove the badge from its list of badges. The MapView object then finds the SensorView object that represents the transceiver of latest detection of the badge termination and tells the SensorView object to add the badge to its list of associated badges. The MapView object also handles the translation between the size and location of the area viewed and the size of the bit map used to display it. The same translation is also used by the SensorView objects for the placement of the transceivers on the map.

Each SensorView object represents one transceiver in the real world system. Each SensorView object contains a list of badges that are currently located at its associated transceiver. SensorView objects draw the transceiver icon on the map and tells the Person object where to draw the badge icons. The SensorView object also handles the right mouse button press. On a right mouse button press, one of three actions can occur: if the button press is not on either a person or transceiver icon, nothing happens; if the button press is on a transceiver icon then the SensorView object builds a pop up menu and displays the associated transceiver's address and a list of all phones associated with that transceiver; if the button press is on a badge icon then the SensorView object builds a pop up menu and displays the name of the badge, the time last seen and how long ago that was. Other associated information includes the badge's home extension, and a list of all the person groups that badge belongs to.

The Person object displays the bit map corresponding to the person type, such as an agents, to which the badge is assigned. The Sensor, Area and PersonGroup objects provide an interface to the database for data storage and/or update.

Referring again to FIG. 11, after displaying the location and/or status information, the applications processor 50 checks for the input of an exit command in step 375. If no exit command has been entered by the supervisor, the map view subroutine executes steps 380–385 to update the displayed map view screen as described above until an exit command is entered. According to the preferred embodiment of the invention, the map view screen is updated nearly periodically, about every one second by having the map view subroutine send to the PBX 30 a message requesting updated location and/or status information for each agent or personnel member. Upon the PBX 30 sending and the applications processor 50 receiving the updated location and/or status information, the map view subroutine again redisplays the map representation from the map graphic data and displays the updated status information on the map representation. As described similarly above, the map view subroutine may alternatively or additionally display the agent designations at correspondingly updated locations, with the updated status information displayed adjacent the agent designations.

Referring again to FIG. 11, at any display screen; i.e. the status screen, the map screen, or the directory screen, entering an exit command causes the subroutine to exit the display command subroutine in step 390 to return to step 305 in FIG. 10 to update the status and location information until the supervisor chooses another display command.

In other alternative embodiments, the location displaying screens may show current calling status of each agent by default, or separate commands may be provided for the supervisor to have specific status information displayed. For example, the supervisor may enter a command to have only agents grouped in a specified agent list displayed on the map representation to show each agent's location and/or status in near real time. Similarly, agents from a specified group or split may be selectively displayed. In the above example with rookie agents grouped in a first agent list, the supervisor may thus monitor the status and location of only the rookie agents by selectively viewing all agents in the first agent list, allowing the supervisor to note each rookie agent's activities. Similarly, the selective viewing of agents by agent list, group, or split in the map representation may employ the "Exception Color Graphics" and color alarms as described above. Similarly, another agent list of agents in a marketing group may be independently displayed with location and/or status information. In conjunction with the independently customized color alarm thresholds, the near real time monitoring capability of the supervisor using independently configured agent lists is greatly enhanced.

In an alternative embodiment, the supervisor system implements predictive abandonment; i.e. call processing for determining and indicating potential abandonment of queued inbound calls. Such predictive abandonment is performed concurrent with other functions of the supervising system 10, allowing the supervisor to minimize lost calls.

Each agent in a group is in a direct call processing work state for the period generally defined as:

TIME AVAILABLE+TALK TIME+WRAPUP TIME which is the average transaction time in seconds from when the agent greets a first caller, conducts and completes the call, and is available to when the agent greets the next caller.

For example, with ten agents in a group addressing active (i.e. non-waiting) calls, for an average transaction time of 200 seconds, each agent of the group becomes available for the next call at least once in any 200 second period. The average agent availability per group is one agent every 200 sec./10=20 seconds. Increasing the number of agents in a group or combining two or more groups increases the average availability; i.e. reduces the time between agent availability.

If the average waiting threshold of a group is 60 seconds before abandonment of a caller waiting in a call queue, then the abandonment is considered predictable; i.e. one can predict that, on average, at 60 seconds a queued caller abandons the call.

In the above example, for a group of ten agents, the logical waiting call queue limit is 60 seconds before abandonment divided by 20 seconds availability of agents to address a queued call; i.e. 3 calls per group. That is, an average of 3 calls may wait in a call queue before predictable abandonment within 60 seconds. Therefore, the maximum capacity of the group prior to predictable abandonment is 13 calls which is 10 calls addressable by the 10 actively available agents plus the call queue limit of 3 calls before predictable abandonment.

Figure 12:
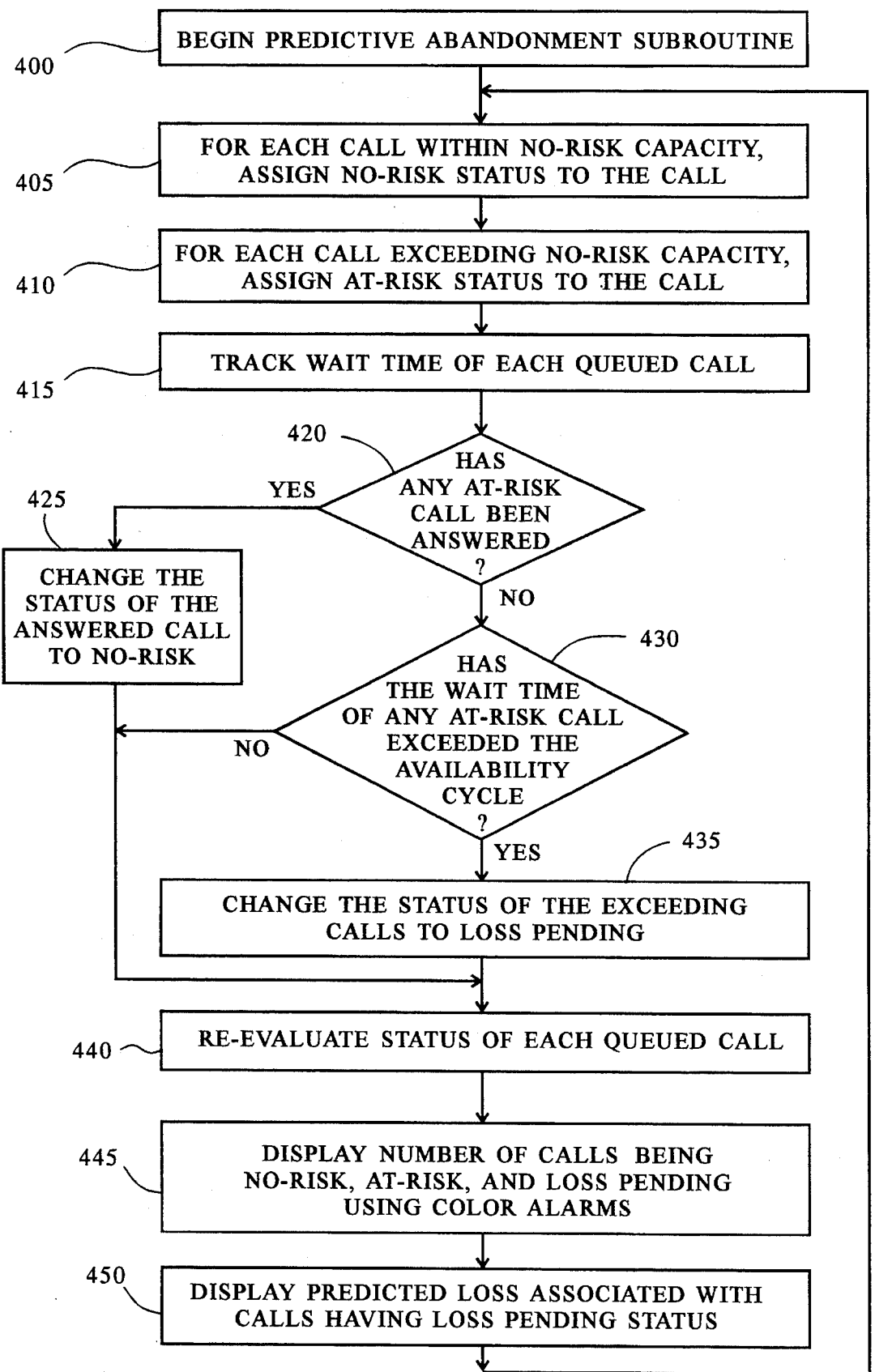
FIG. 12 illustrates a block diagram of a predictive abandonment subroutine.

In operation, as shown in the block diagram in FIG. 12, the supervising system begins the predictive abandonment subroutine in step 400 which may operate concurrently with other functions of the supervising system 10. As each inbound call is queued, the status of the queued call is evaluated with respect to the status of the other queued calls and the NO-RISK capacity of the queue. In step 405, for each queued call within the NO-RISK capacity, NO-RISK status is assigned to these queued calls up to the NO-RISK capacity. In the above example, the first 13 queued calls are in a NO-RISK state and should be answered prior to attainment of the abandonment threshold.

Referring again to FIG. 12 and the above example, when more than 13 calls arrive for service by the group of 10 agents, the calls in excess of the 13 call NO-RISK capacity are AT-RISK of abandonment and are assigned the AT-RISK status as in step 410. These excess AT-RISK calls may be answered if some of the 13 calls are answered and completed below the 20 second average availability cycle. After one call becomes AT-RISK, all subsequently queued calls and any new calls arriving in the queue become AT-RISK.

The wait time of each queued call is tracked by the supervisor system 10 in step 415, and the answering of any AT-RISK call by an agent is detected in step 420. Once an AT-RISK call in the queue is answered, the status of the answered call is changed to NO-RISK in step 425 until it is removed from the call queue, and the status of the remaining AT-RISK calls is reevaluated in step 440, where some queued calls may change to NO-RISK. If no AT-RISK call is answered in step 420, and the wait time of the AT-RISK calls are detected to be within the average availability cycle, the status of each call is reevaluated in step 440. However, after the 20 second average availability cycle has passed, and the wait times of any AT-RISK call exceeds the availability cycle in step 430, if a call which is AT-RISK does not change to NO-RISK status, then the status of such an AT-RISK call changes to LOSS PENDING in step 435; i.e. the call is predicted to become abandoned, necessitating reevaluation of the status of each queued call in step 440.

The supervising system thus maintains the state of each queued call as:

NO-RISK which should be answered prior to the abandonment threshold;

AT-RISK which may become abandoned; and

LOSS PENDING which is predicted to become abandoned.

After step 440, the supervising system 10 then displays the number of queued calls in step 445 according to their call status, and the supervising system 10 continues to assign call status to newly queued calls in steps 405–410 and update the call status in steps 415–440.

As described above, the supervisor system allows the supervisor to add agents to groups. Thus, as the number of inbound calls to one group increases, the supervisor may reassign inbound agents and/or outbound agents from other groups to address the queue inbound calls to forestall call abandonment. Entire groups may also be combined to address increasing numbers of queued calls to minimize abandonment.

The supervisor system is initially set to have a default AVERAGE WAIT TO ABANDON of 60 seconds, which the supervisor may change; for example, to a lower or higher value to accelerate or retard, respectively, the predictive abandonment test. For example, the supervisor may increase the AVERAGE WAIT TO ABANDON setting to allow the supervisor additional time to reassign agents to the group having an increasing number of AT-RISK or LOSS PENDING calls.

It is also contemplated that the reassignment of agents between groups may be performed automatically by the supervisor system, where outbound agents may be automatically logged out and redesignated as inbound agents as described in commonly assigned U.S. patent application Ser. No. 08/123,309, filed Sep. 17, 1993, which is incorporated herein by reference.

In addition, as the AVERAGE WAIT TO ABANDON setting and/or the number of agents in a group using such predictive abandonment techniques are changed, the supervisor system may automatically reevaluate the AT-RISK and LOSS PENDING status of the queued calls to reflect the impact of such changes to prevent call abandonment.

In the alternative embodiment of the predictive abandonment facilities, the supervisor system preferably displays the number of NO-RISK, AT-RISK, and LOSS PENDING calls for each group displayed on the activity/group dynamic screen shown in FIG. 2. As shown in FIG. 2, group 1 is displayed, as indicated by the reverse color display of "1" on the upper right of the activity/group dynamic screen. As indicated in FIG. 2, there are 12 agents in group 1 and 5 agents available in other groups. Also, in group 1, 5 agents are busy, no agents are available, and 3 calls are queued and waiting to be answered.

As shown, for example, in the lower left side portion of the activity/group dynamic screen, there are six NO-RISK calls (i.e. the five busy calls plus one queued call waiting to be answered), one AT-RISK call, and one LOSS PENDING call. That is, in this example, of the three calls waiting in the queue, one call is in each of the NO-RISK, AT-RISK, and LOSS PENDING states.

In a further alternative embodiment shown in step 445 in FIG. 12, the supervisor system 10 implements color alarms and "Exception Color Graphics", as described above, to indicate to the supervisor, for example, that there is at least one AT-RISK call which has exceeded a predetermined time threshold waiting in the queue. That is, although the AT-RISK calls are not predicted to be abandoned (i.e. LOSS PENDING), the supervisor is alerted to pending predicted abandonment of at least one AT-RISK call.

For example, if the AVERAGE WAIT TO ABANDON time for group 1 is 20 seconds, the number of AT-RISK calls may be set to have its background color of the screen section turn yellow when at least one AT-RISK call has been waiting in the queue for 10 seconds, and the background color turns red after 15 seconds. Thus, when the background color turns red, the supervisor is alerted that at least one AT-RISK call is predicted to be abandoned in 5 seconds. As described in detail above, the color alarm time thresholds for these predictive abandonment features may have default setting which are reconfigurable by the supervisor.

Referring again to FIG. 12, additional features of the supervising system 10 implementing the predictive abandonment subroutine include the display of the financial impact of abandoned (i.e. lost) calls on the activity/group dynamic screen by step 450, as shown, for example, in the lower left side portion in FIG. 2. For example, in a pizza takeout franchise selling pizza at $10 per pie (including tax and delivery), the one call shown in FIG. 2 having a LOSS PENDING status is predicted to cost the franchise $10. Therefore, as shown in FIG. 2, the revenue of $10 is in danger or at risk of being lost. The total losses of the franchise by the displayed group may also be displayed, as shown in FIG. 2. As the status of calls is updated in steps 400–445, the predicted loss is updated and displayed in step 450 of FIG. 12.

The supervising system may further store in memory a compilation of the costs per lost call based on prior statistics from a telemarketing campaign or vendor franchise and/or estimates or default settings provided by the supervisor. In the franchise example above, as determined by historical statistics of sales, a successful call may sell an average of 1.2 pizza pies, drinks, garlic bread, and the like, and the average amount of tax and shipping for a sale may be determined from previous sales. Therefore, the average cost per lost call may be determined to be, for example, $25, and the current cost of the LOSS PENDING calls, if lost, would be the number of LOSS PENDING calls multiplied by the average cost per lost call which is displayed accordingly. In further embodiments, the supervisor system is capable of generating financial reports based on the statistics of the activities of each group of agents.

In further embodiments, audio alarms may be used in conjunction with or instead of the above described color alarms; i.e. upon the exceeding of a threshold indicating predetermine state changes, such as a LNGST time exceeding 3 minutes, a message or warning sound may be transmitted by the supervisor system over an intercom or a telephone headset.

It is also contemplated that other audio facilities may be employed by the supervisor system of the present invention, such as paging over intercoms, agent telephone headsets, or the like. For example, a supervisor alerted by a color alarm of a threshold being exceeded may initiate a page to an available agent to answer inbound calls. The supervisor system may maintain, for example, 10 paging zones and implement the paging facilities as described in commonly assigned U.S. patent application Ser. No. 07/774,600 which is incorporated herein by reference. Furthermore, other communication systems such as automated voice response units (VRU), interactive voice response (IVR) systems, and automatic attending may also be employed by the present supervisor system.

While the invention has been particularly shown and described with reference to the preferred embodiments, it will be understood by those skilled in the art that various modifications and changes in form and detail may be made without departing from the scope and spirit of the invention. Accordingly, modifications such as those suggested above, but not limited thereto, are to be considered within the scope of the invention.

What is claimed is:

1. An agent supervising apparatus for supervising an automatic call distribution (ACD) telephone system having a plurality of telephone stations assigned to a plurality of agents for handling a plurality of telephone calls, the ACD being coupled to a locating network for determining the locations of said agents, the agent supervising apparatus comprising:

an agent supervising station including a processing unit, a display and an input device for monitoring a plurality of agent call handling status;

said locating network including:

a plurality of remote badge units, each being associated with a respective one of said plurality of agents for transmitting corresponding identification information;

a plurality of transceivers, each adapted for detecting said identification information from said remote badge units and for forwarding said identification information to a locating processor; and said locating processor being responsive to said identification information for generating location information corresponding to the locations of said plurality of agents; and said processing unit of said agent supervising station including associated memory and stored programs, responsive to said location information and to commands from said input device, for displaying on said display a graphic indicating said call handling status including locations of said plurality of agents.

2. The agent supervising apparatus as set forth in claim 1 wherein said display displays said agent call handling status.

3. The agent supervising apparatus as set forth in claim 2 wherein said agent call handling status includes the number of calls waiting to be answered and the number of agents available to answer calls.

4. The agent supervising apparatus as set forth in claim 1 wherein each of said plurality of agents is assigned to one of a plurality of agent groups and said graphic includes a listing of the number of available agents, the number of calls waiting to be answered, and the longest time a caller has been waiting in each of said agent groups.

5. The agent supervising apparatus as set forth in claim 1 wherein said associated memory of said supervising station stores bit map graphic data including a positional representation of an ACD facility housing said ACD system, and said graphic is generated from said bit map graphic data and includes a map representation of said ACD facility.

6. The agent supervising apparatus as set forth in claim 5 wherein:

said telephone stations and corresponding assigned agents are displayed on said map in one mode; and said map representation depicts in a second mode, the locations of said agents as determined by said locating network.

7. An automatic call distribution (ACD) telephone system having a plurality of telephone stations distributed throughout an area in a facility, each of said telephone stations being assigned to a respective one of a plurality of agents for handling a plurality of telephone calls, said ACD telephone system comprising:

an agent supervising station including a processor, a display and an input device for monitoring agent call handling status;

a locating network connected to said agent supervising station for determining the locations of said agents, including:

a plurality of remote badge units each respectively assigned to each of said plurality of agents for transmitting corresponding identification information;

a plurality of remote transceivers positioned at predetermined locations throughout said area for detecting said identification information and for forwarding said identification information to a locating processor; and said locating processor being responsive to said identification information for generating location information corresponding to the locations of each of said plurality of agents; and said processor of said agent supervising station including associated memory and stored programs, responsive to said location information and to commands from said input device, for displaying on said display a graphic indicating each agent at the location determined by said locating network.

8. The ACD telephone system as set forth in claim 7 wherein said graphic includes agent status in changing colors as call status changes.

9. The ACD telephone system as set forth in claim 7 wherein said associated memory of said supervising station stores bit map graphic data representing the geographic layout of said area, and said graphic including a display of said geographic layout is generated from said bit map graphic data, said graphic further includes an indication of the locations of each of said agents in said area.

10. The ACD telephone system as set forth in claim 7 wherein said associated memory of said supervising station includes stored programs for performing multiple tasks including separating said agents by groups and selectively assigning different agents to different tasks.

11. The ACD telephone system as set forth in claim 10 wherein said agent tasks include handling inbound and outbound calls.

12. An agent supervising apparatus for a telephone system having a plurality of telephone stations assigned to a plurality of agents and call distribution to said telephone stations, the agent supervising apparatus comprising:

an agent supervising station including a processing unit, a display and an input device, said processing unit including associated memory and stored programs for storing map graphic data, agent identification information, and a plurality of telephone station designations, said processing unit being responsive to commands from said input device for displaying on said display a map representation corresponding to said map graphic data and for displaying a portion of said agent identification information positioned on said display corresponding to said plurality of telephone station designations; and a locating network connected to said agent supervising station, including:
- a plurality of remote badge units assigned to a respective plurality of agents for transmitting corresponding agent identification information;
- a plurality of remote transceivers for detecting said agent identification information and for forwarding said agent identification information to a locator processor; and
- said locator processor being responsive to said agent identification information for generating location information corresponding to the locations of said agents.

13. The agent supervising apparatus as set forth in claim 12 wherein said processing unit of said agent supervising station receives status information relating to a respective state of the distributed calls to the plurality of telephone stations, and displays on said display a portion of said status information corresponding to said telephone station designations.

14. The agent supervising apparatus as set forth in claim 13 wherein said processing unit further includes means for changing color attributes as said status information changes.

15. The agent supervising apparatus as set forth in claim 14 wherein said changing means responds to at least one threshold condition of said status information being attained to change said color attributes.

16. The agent supervising apparatus as set forth in claim 14 wherein said processing unit includes menu means for generating a menu on said display to set said at least one threshold condition.

17. The agent supervising apparatus as set forth in claim 12 wherein said telephone station designations correspond to the location of said telephone stations relative to said plurality of remote transceivers.

18. The agent supervising apparatus as set forth in claim 12 wherein:
- said telephone stations and remote transceivers are located in a geographic region; and
- said map representation depicts corresponding locations of the geographic region and depicts said telephone stations positioned according to said telephone station designations.

19. The agent supervising apparatus as set forth in claim 12 wherein said locator processor sends said location information to said processing unit through a private branch exchange (PBX).

20. An agent supervising apparatus for a telephone system having a plurality of telephone stations assigned to a plurality of agents and call distribution to said telephone stations, the agent supervising apparatus comprising:
- an agent supervising station including a display and an input device; and
- a processing unit including:
  - associated memory and stored programs for storing agent identification, call status information, and a plurality of telephone station designations, said associated memory including a queue of queued inbound calls;
  - means for predicting potential loss of at least one of said queued inbound calls; and
  - signalling means, responsive to said means for predicting, for signalling said agent supervising station of said potential loss.

21. The agent supervising apparatus as set forth in claim 20 wherein said means for predicting includes means for analyzing a plurality of parameters including average agent availability time.

22. The agent supervising apparatus as in claim 21 wherein at least one of said parameters is user adjustable.

23. The agent supervising apparatus as set forth in claim 20 wherein said signalling means displays on said display a portion of said status information indicating potential loss of calls having color attributes corresponding to said call status information.

24. The agent supervising apparatus as set forth in claim 23 wherein said processing unit further includes means for displaying potential costs corresponding to said potential loss of calls.

25. The agent supervising apparatus as set forth in claim 24 wherein said processing unit further includes means for changing said color attributes as said call status information changes.

26. The agent supervising apparatus as set forth in claim 25 wherein said changing means responds to at least one threshold condition of said call status information to change said color attributes.

\* \* \* \* \*